United States Patent [19]

Bowman et al.

[11] Patent Number: 5,440,738
[45] Date of Patent: Aug. 8, 1995

[54] METHOD AND APPARATUS FOR DIGITAL DATA PROCESSOR FILE CONFIGURATION DETECTION

[75] Inventors: Philip B. Bowman, Bradford; Richard L. Cohen, Norwich, both of Vt.; Brett J. Robichaud, Lebanon; Charles A. Muntz, Hanover, both of N.H.

[73] Assignee: Tally Systems Corporation, Hanover, N.H.

[21] Appl. No.: 326,738

[22] Filed: Oct. 20, 1994

Related U.S. Application Data

[63] Continuation of Ser. No. 906,679, Jun. 30, 1992, abandoned, which is a continuation of Ser. No. 702,766, May 16, 1991, abandoned.

[51] Int. Cl.[6] ............................................. G06F 15/177
[52] U.S. Cl. .............................. 395/600; 364/DIG. 1
[58] Field of Search ............................................ 395/600

[56] References Cited

U.S. PATENT DOCUMENTS

| | | | |
|---|---|---|---|
| 4,823,306 | 4/1989 | Barbic et al. | 364/900 |
| 4,967,391 | 10/1990 | Iijima | 364/900 |
| 4,972,364 | 11/1990 | Barrett et al. | 364/900 |
| 4,980,842 | 12/1990 | Kamada et al. | 364/518 |

OTHER PUBLICATIONS

Microsoft MS-DOS Version 3. Zenith Data Systems, 1984, 1985, pp. 7.2–7.19, 8.10–8.11, 11.92–11.104 11.152–11.159, 11.194–11.201.

*Primary Examiner*—Thomas G. Black
*Assistant Examiner*—Peter Y. Wang
*Attorney, Agent, or Firm*—Lahive & Cockfield

[57] ABSTRACT

An apparatus for determining the status of files stored, e.g., on the disk drive of a computer compares the name of a file to be inventoried (the "member" or "suspect" file) against a list of names of component files belonging to certain known file sets. If the member file's name compares favorably with one or more names of the component files the apparatus runs tests on the member file. These include comparing data stored in the member file with data patterns of the matching component files. The apparatus determines the confidence factor of the association between the member file and the matching component file based, at least in part, on the test results. Depending on the level of the confidence factor, it generates an output signal including the name of member file and the name of the set of the matching component file.

38 Claims, 7 Drawing Sheets

SYSTEM OVERVIEW

FILE REGOGNITION

PRODUCT RECOGNITION

METHOD AND APPARATUS FOR DIGITAL DATA PROCESSOR FILE CONFIGURATION DETECTION

REFERENCE TO RELATED APPLICATIONS

This application is a continuation of U.S. Application Ser. No. 07/906,679, filed on Jun. 30, 1992, now abandoned, which is a continuation of U.S. Patent Application Ser. No. 07/702,766, filed May 16, 1991, now abandoned.

BACKGROUND OF THE INVENTION

The technical field of this invention is computer systems administration and, more particularly, apparatus and methods for maintaining an accurate inventory of the software products installed on a computer.

Historically, the task of producing and maintaining an accurate software inventory (a list of software products that have been installed on a computer, or set of computers) was not difficult. Many computers in use were large mainframes, for which there were only a limited number of software vendors, and only a relatively small number of products to keep track of. Moreover, installation of most software was performed by only a limited group of persons, e.g., system administrators.

Since the advent of the personal computer, the task of maintaining software inventories has become dramatically more difficult. To begin, most personal computer users are capable of installing software packages, without the assistance—or control—of a system administrator.

Moreover, there has been a large increase in both the number and complexity of available software products, as well as an increase in the storage capacity of most computers. Further, modern computer storage systems have increased in complexity, typically their file systems are organized into directories, such that each directory can store several files. Thus maintaining a software inventory typically involves searching through a large and complex set of directory hierarchies.

Also complicating the task of maintaining a software inventory are the possibilities of multiple installations of a single product, incomplete installations of a product, and multiple instances of a single file belonging to one product.

Thus, as computers have evolved, the difficulty of creating and maintaining an accurate software inventory has dramatically increased.

It is an object of the present invention to provide a method and an apparatus for producing such an inventory.

It is a further object of the invention to produce a software inventory in a faster and more reliable way.

SUMMARY OF THE INVENTION

The above and other objects are attained by the invention which provides, in one aspect, an apparatus for determining the status of files stored, e.g., on the disk drive of a computer. That status includes, for example, a common name identifier and optionally, a version number (e.g. "Word Perfect TM ver. 5.1").

In accord with one aspect of the invention, the apparatus compares the name of a file to be inventoried (the "member" or "suspect" file) against a list of names of component files belonging to known file sets (e.g., files composing "Microsoft Word TM," "Word Perfect TM," etc.). If the member file's name compares favorably with one or more names of the component files the apparatus runs tests on the member file. These include comparing data stored in the member file with data patterns of the matching component files.

The apparatus determines the confidence factor of the association between the member file and the matching component file based, at least in part, on the test results. Depending on the level of that factor, it generates an output signal including the name of member file and the name of the set of the matching component file.

These and other aspects of the invention are evident in the drawings and in the description which follows.

DETAILED DESCRIPTION

Software recognition is divided into two distinct processes—file recognition and product recognition.

Software products consist of one or more files. File names are not necessarily unique across different software products. The first recognition task is to determine if the files scanned by the software collector are the files which the Census knowledge believes make up its software products. This is the file recognition process.

Once it is determined with little doubt which files the collector has found, then files can be grouped and sorted into product file sets and viewed as software products. This is the product recognition process.

System Dataflow

Figure 1:
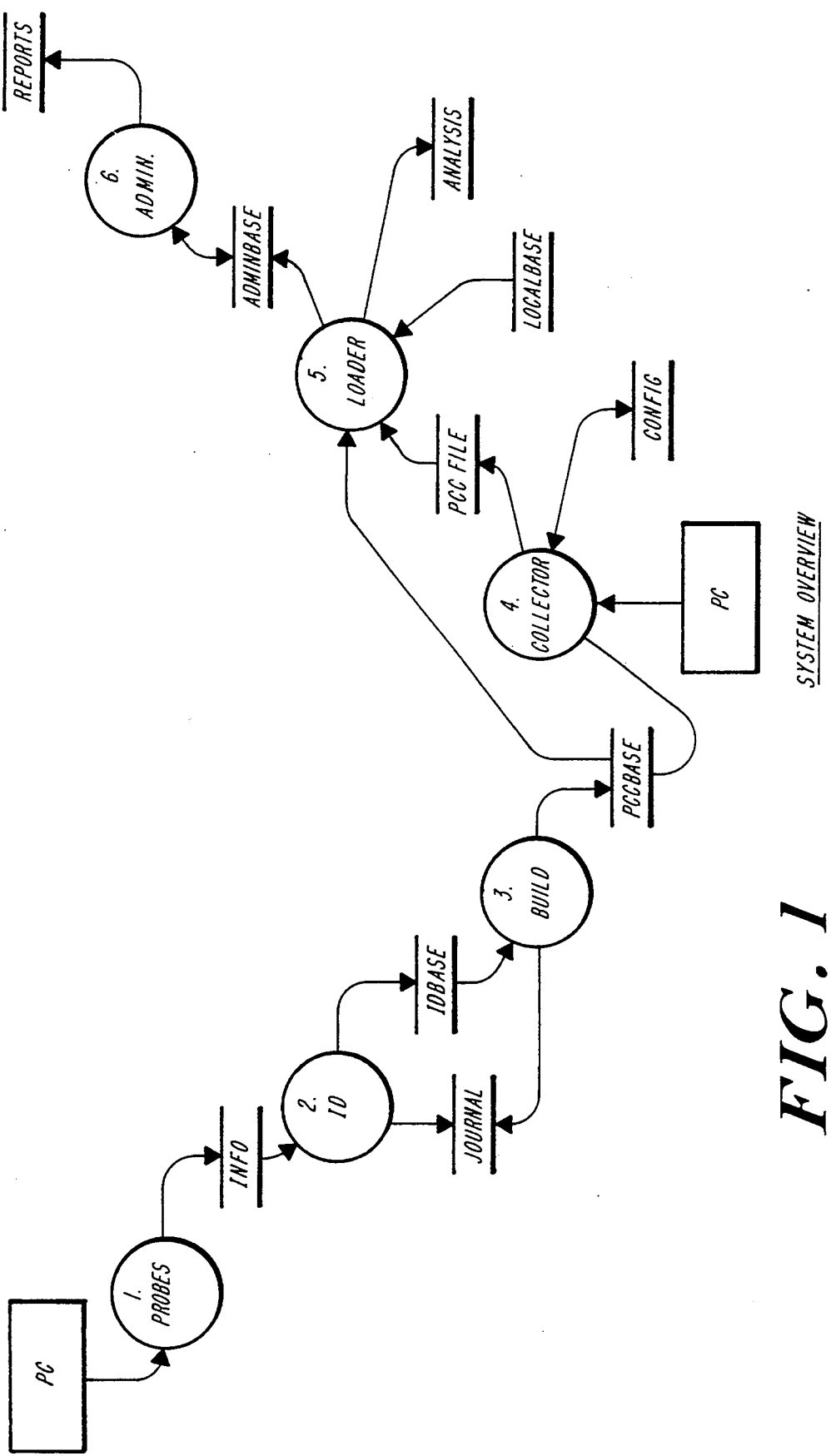
FIG. 1 depicts the flow of information through a file identification and product recognition system according to the invention as referred to herein as the "Census" system.

The Software Recognition Module (SRM) must be understood in terms of overall system data flow. FIG. 1 illustrates the flow of information through the entire Census system.

Bubbles 1-3 represent processes that are run to build the Census knowledge base. Various probes 1 are run to "fingerprint" specific hardware and software components. The information is stored in INFO files 10. A probe can be shipped to a customer if there is a problem identifying a component or Census encounters an unknown component.

ID system 2 reads the INFO files 10 and requests the system maintainer to make a few decisions (e.g. assigning class type) before the information is stored in the ID database 11. The ID system 2 automatically assigns product IDs and verification test numbers. The ID system 2 also keeps a journal of any changes made to the ID database 11, since this database is the master database from which all Knowledge Base (KB) files, delivered DBF files, and source code tables are produced.

The build stage 3 creates and updates all of the delivered files and source code tables. The result from the build stage is an encrypted set of KB files, a set of DBF files which become part of the administration database, miscellaneous configuration tables, and source code files which are later compiled to create the executables which are shipped. All of these files are grouped under the label "PCCBASE" 12.

The PCCBASE 12 which is shipped to the customer is used by collector 4 while it scans the customer's PC 13. Hardware recognition is performed at this stage. Verification tests are also run during software collection to identify individual files. The collector 4 creates a configuration entry and stores its results in a PCC file 14.

Software file recognition and product recognition are performed when the PCC file 14 is loaded by loader 5 into the administration database 15. Optional analysis files 16 can be created during the software recognition process which explain how it reached file and product conclusions. Once the recognized hardware and software components are loaded into the administration database 15, reports 17 can be generated.

ent versions of the same product are assigned unique product IDs) the current file being collected belongs to.

For recognition purposes, the most informative VT is detecting the version number of a software product from text inside a component file. This can be accomplished by recognizing a specific version string at a known position in a file. Not only does this identify the software product to which the file belongs, it also determines the version of the product. These VTs are classified as version tests and are indicated by the notation 'V'.

The second most informative test is determining the software product name. The name test is usually a more general form of the version test. For example, a version test might search for "LOTUS 3.0" whereas a name test might search for only "LOTUS". If the name is determined but not the version, there is a chance that the file recognized is a version released after the latest KB files were updated. This is important information to capture. These VTs are classified as name tests and are indicated by the notation 'N'.

If a collector version test passes, it is unnecessary to perform a name test since a version test implies the software product name is known. If no VT passes, the File Recognition Module (FRM) must rely on the file name, timestamp, and length to positively identify a file.

Verification Test Numbering

The Verification Test (VT) numbers listed in the

Data Flow Table
The following table traces data elements as they move through the system from PC disk to the output of the FRM. It can be useful for design changes to know where these elements come into and flow out of the system.

| Parameter | DISK | KB SVFU | VTO File | PCC File | FRM List | CAND List | FRA File | FRO List | TIE List |
| --- | --- | --- | --- | --- | --- | --- | --- | --- | --- |
| Product ID |  | SV-U | x |  | x | x | x | x | x |
| File Name | x | SVF- | x | x | x | x | x | x | x |
| File ext | x | SVF- | x | x | x | x | x | x | x |
| Found drive | x | ---- | x | x | x | x | x | x | x |
| Target subdir |  | S--- |  |  |  | x |  |  |  |
| Found subdir | x | ---- | x | x | x | x | x | x | x |
| Target length |  | S--- |  |  |  | x |  |  |  |
| Found length | x | ---- | x | x | x | x | x |  | x |
| Target DLM |  | S--- |  |  |  | x |  |  |  |
| Found DLM | x | ---- |  | x | x | x | x |  | x |
| Primary Count |  | S--- |  |  | x | x |  | x | x |
| VT test # |  | -V-- | x |  |  |  |  |  |  |
| VT test passed |  | ---- | x | x |  |  | x |  |  |
| VT V or N pass |  | ---- | x |  | x | x |  | x | x |
| VT target offset |  | -V-- | x |  |  |  |  |  |  |
| VT found offset | x | ---- | x |  |  |  |  |  |  |
| VT Confidence |  | -V-- |  |  |  |  | x |  |  |
| VT param format |  | -V-- |  |  |  |  |  |  |  |
| VT param data |  | -V-- |  |  |  |  |  |  |  |
| VT param length |  | -V-- |  |  |  |  |  |  |  |
| Search time |  | ---- | x |  |  |  |  |  |  |
| Duplicates |  | ---- |  |  | x |  |  | x | x |
| Tie level |  | ---- |  |  | x | x |  | x | x |
| CF length |  | ---- |  |  |  | x | x |  |  |
| CF DLM |  | ---- |  |  |  | x | x |  |  |
| CF subdir |  | ---- |  |  |  | x | x |  |  |
| CF VT tests |  | ---- |  |  |  | x | x |  |  |
| CF total |  | ---- |  |  |  | x | x |  |  |
| File chosen |  | ---- |  |  |  |  |  | x |  |

Notes
1. Knowledge Base (KB) file key: 'S' = SWP.KB, 'V' = VT.KB, 'F' = FS.KB, 'U' = UV.KB

VERIFICATION TESTS

Verification Test Classes

Files with the same name can belong to several different products simultaneously. Verification tests (VT) are used to differentiate which product (or version—differresult string are codes which indicate which VTs the specified file passed. This number is generated by the ID system 2 and is meaningful only when paired with a file name (ie. they are not unique across the VT Knowledge Base (VT KB).

As software records are analyzed during loading, the VT result string is parsed and the test numbers are used to search through the VT KB. When the file name is found, the VT number passed will point to a confidence factor (CF) value which is used by the File Recognition Module (FRM).

Verification Test Triggering

During software collection, specific file names will trigger a VT. Any number of tests may be performed on a specific file. When a file name is collected, a VTCOL list is searched for all VTs defined for that file. One by one each VT is executed against the file and the results are accumulated in the result string. The result string is appended to the file data line in the PCC file 14.

Verification Test Algorithms

Five algorithms are defined for searching a file for a literal string. In one preferred embodiment each VT process code identifies the class of test (version or name) and the specific algorithm used to search the file. A process code of 200 to 299 indicates a version test. A process code of 100 to 199 indicates a name test. The specific algorithm can be extracted from the process code by the following:

algorithm# = vt.process (mod divide) 100

The algorithms available are defined as follows:

---

Algorithm #1: Absolute Offset Search
SEARCH STRING           :"Version 2.0"
TARGET OFFSET           :12
BEGIN SEARCH OFFSET     :12
END                     :12
OFFSET#       0      10      20      30
              :      :       :       :
FILE          : : : : : : : : : : : :V:e:r:s:i:o:n: :2:.:0: : : : : : : :
Algorithm #2: Absolute Offset to End of File Search
SEARCH STRING           :"Version 2.0"
TARGET OFFSET           :12
BEGIN SEARCH OFFSET     :12
END SEARCH OFFSET       :29
OFFSET#       0      10      20      30
              :      :       :       :

Algorithm #3: Offset ZERO to End of File Search
SEARCH STRING           :"Version 2.0"
TARGET OFFSET           :12
BEGIN SEARCH OFFSET     :0
END SEARCH OFFSET       :29
OFFSET#       0      10      20      30
              :      :       :       :
FILE          : : : : : : : : : : : :V:e:r:s:i:o:n: :2:.:0: : : : : : : :
Algorithm #4:
Plus and Minus Five Percent of File Length Search
SEARCH STRING           :"Version 2.0"
TARGET OFFSET           :12
BEGIN SEARCH OFFSET     :10
END SEARCH OFFSET       :14
OFFSET#       0      10      20      30
              :      :       :       :
FILE          : : : : : : : : : : : :V:e:r:s:i:o:n: :2:.:0: : : : : : : :
Algorithm #5: Exhaustive Search When Percent Search Fails
OFFSET#       0      10      20      30
              :      :       :       :
FILE          : : : : : : : : : : : :V:e:r:s:i:o:n: :2:.:0: : : : : : : :

1. (#4)

2. (#3)

---

VTO—Verification Test Timing and Offsets

The VTO analysis file is created when collector analysis is enabled.

VTs are strictly ordered for execution speed efficiency. This ordering is done by the build stage 3 (shown in FIG. 1) when creating the VT.KB file. All VTs are resource and time expensive since files are opened and scanned character by character. A file is opened, all VT tests are performed, then the file is closed.

All version tests ("V") are executed before name tests ("N") because a version test succeeding implies that the product name is known. A version test succeeding also implies that any further version test would be unnecessary (the version has already been identified). Once a version test succeeds, the remaining version tests scheduled to be performed are skipped.

---

Sample VTO Data

File - C:\QEMM  Size: 37134  VT Count: 1
S8541003  #1    Type: 204  5%          V  passed  72 ms    S: 2245    F: 2245    Var.: 0%
Result: 1,
File - C:\BIN\B.EXE  Size: 98001  VT Count: 6
S2000003  #5    Type: 204  5%          V  Failed  28 ms    S: 108921
S2000002  #3    Type: 204  5%          V  Failed  5 ms     S: 72293
S2000001  #1    Type: 204  5%          V  Failed  44 ms    S: 92371
S2000003  #6    Type: 105  5%0toEOF    N  Passed  3713 ms  S: 109054  F: 92649   Var.: −16%
S2000002  #4    Type: 105  5%0toEOF    N  *same*  0 ms     S: 72517
S2000001  #2    Type: 105  5%0toEOF    N  *same*  0 ms     S: 92491
Result: 6,4,2
File - C:\BIN\DIFF.EXE  Size: 17204  VT Count: 1
S8599L01  #100  Type: 105  5%0toEOF    N  Failed  832 ms   S: 10820
Result:
File - C:\BIN\GDA\DS.EXE  Size: 39086  VT Count: 6
S8511004  #1    Type: 204  5%          V  Failed  28 ms    S: 25311
S8511005  #3    Type: 204  5%          V  Failed  93 ms    S: 33706
S8511006  #5    Type: 204  5%          V  Failed  4892 ms  S: 529
S8511006  #6    Type: 105  5%0toEOF    N  Failed  1610 ms  S: 24224
S8511004  #2    Type: 105  5%0toEOF    N  *same*  0 ms     S: 25620
S8511005  #4    Type: 105  5%0toEOF    N  *same*  0 ms     S: 34736
CCHELP.EXE  Size: 143014  VT Count: 3
S3051001  #1    Type: 105  5%0toEOF    N  Passed  80 ms    S: 26715   F: 26715   Var.: 0%
S3051002  #2    Type: 105  5%0toEOF    N  *same*  0 ms     S: 9919
S3051003  #3    Type: 105  5%0toEOF    N  *same*  0 ms     S: 9919
Result: 1,2,3

| VTO Fields Explained | | | | | | | | |
|---|---|---|---|---|---|---|---|---|
| 1. Product ID | 2. ID VT# | 3. Test Type Code# | 4. Test Type Comment | 5. Test Result | 6. Execute Time | 7. Seek Offset | 8. Found Offset | 9. Found Variance |
| S8541003 | #1 | Type: 204 | 5% V | Passed | 72 ms | S: 2245 | F: 2245 | Var.: 0% |

1. Product ID

The product ID implied for the file if the test passes. There is usually a minimum of one name test and one version test for each file recognized by the SRM. This is why a product ID can appear several times during VT tests executed against one file.

2. ID VT#

The unique VT number assigned by the ID system. Each file can have an unlimited number of VT tests run against it. Each test is numbered to differentiate which tests succeed. Note that the result string is merely these test numbers which succeeded. This information, together with the file name and extension, is used to reconstruct the test results (the product ID of the successful tests) at the FRM level. This avoids saving the product ID to the PCC file.

3. Test Type Code#The process code identifies the class of test (version or name) and the specific algorithm used to search the file. Currently defined tests:

0. No Operation
 1. Search fixed number of characters; start at passed offset
 2. Search from passed offset to end of file
 3. Search from offset 0 to end of file
 4. Search within 5%±of offset
 5. Search within 5%±offset; if fails, try a #3

4. Test Type Comment

A descriptive translation of the test algorithm code.

5. Test Result

PASSED—string was located at or within offset range.

Failed—string was not located at or within offset range.

*same*—test was previously executed and test results must be the same; test is not repeated.

6. Execute Time

Milliseconds elapsed for test to be performed.

7. Seek Offset

File character offset from beginning of file where string is expected.

8. Found Offset

File character offset from beginning of file where string was actually found.

9. Found Variance

Percent difference between seek offset and found offset.

$$variance = (found\_offset - seek\_offset / file\_size) * 100$$

10. Result

A comma delimited listing of the VT ID numbers which succeeded. This string is appended to the file entry in the PCC file. This information is used during file recognition to determine whether the product version is known and the confidence factor contributed for each test.

LOADER

The loader is the portion of the administration code which is responsible for reading the PCC collection files, initiating file and product recognition, and loading the appropriate data bases with the results.

The process is separated into three distinct phases—reading, recognition, and loading. This separation into input/process/output phases was an attempt to reduce the complexity of the system by keeping each phase self contained. The three phases are as follows:

1. Read PCC collection file parameters and either
  A. Store hardware parameters, or
  B. apply software recognition (FRM) to software file parameters.
2. Start software product recognition (Product Recognition Module (PRM)).
3. Load database with components from the product list.

Hardware components are loaded directly into loader parameter table. Software files are processed as they are read from the PCC file. Recognized files are added to the "found file" list. All other files are discarded.

Once a complete configuration has been read, the product recognition module (PRM) is started and processes the "found file" list. The PRM adds software products it recognizes to the same product list as the Hardware Recognition Module (HRM). When all (hardware and software) components have been added to the product list control is passed to the database loading routine. The database loading routine reads components from the product list and inserts them into the administration tables 15 (as shown in FIG. 1).

Reading the PCC File Configurations

Figure 2:
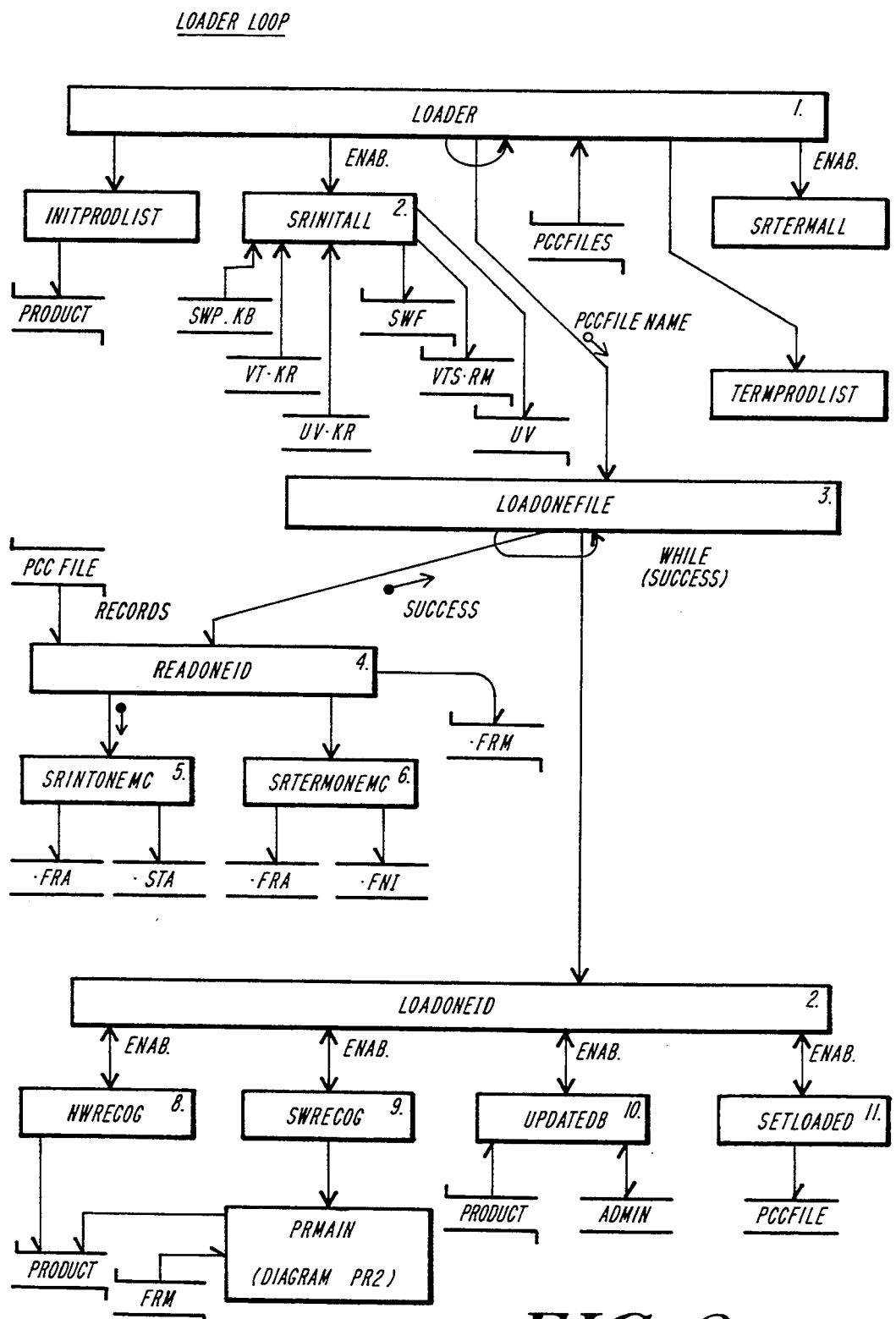
FIG. 2 illustrates the program control structure of the PCC file loading, file identification, and product identification processes for the illustrated embodiment of the invention.

FIG. 2 illustrates the program control structure of the PCC file loading, file identification, and product recognition processes for a preferred embodiment of the invention. Loader Control 20 is the highest level routine of the loading process and controls three subprocesses—initialization, reading the list of disk files (PCCFILES 30), and termination. Routine SRInitAll( ) 21 is called if software loading is enabled. It reads in the three knowledge base files Software File KB 31 (SWP.KB), VT.KB 32, and UV.KB into their respective memory lists SWF 34, VTSRM 35, and UV 36. These lists remain in memory until the entire set of requested PCC files 30 have been processed. For each PCC file 14 in the PCCFILES list 30, routine LoadOneFile( ) 22 is called. Since the number of configurations contained in each PCC file 14 is undetermined, this routine will call ReadOneID( ) 23 while more valid configurations are detected in the PCC file 14.

A valid configuration is determined by the routine boundpc( ) (called from within ReadOneID( ) 23). If both a valid "*NEWPC*" and "*ENDPC*" delimiter are found with matching configuration IDs, it is assumed the configuration data is intact and "well-bounded". Routine boundpc( ) scans forward in the file until it finds a "*NEWPC*" delimiter. It then scans forward in the file until it finds a matching "*ENDPC*" delimiter. If they match (and no unexpected delimiters are found out of sequence in between) the file pointer is rewound to the start of the configuration where data reading will begin. If the loaded flag is already set to "1" (loaded), then the configuration is not read.

| Delimiter | Indicates |
|---|---|
| *NEWPC*<CONFIG_ID> | beginning of configuration <CONFIG_ID> data |
| *ENDPC*<CONFIG_ID> | end of configuration <CONFIG_ID> data Sets record type state to "unknown" |
| *LOADED*<BOOLEAN> | loaded flag value <BOOLEAN> |

Before a configuration, or machine (MC), is read from disk, routine SRInitOneMC( ) 24 initializes a new set of analysis files.

As each line is read from the file it is scanned for a data delimiter. These delimiters control the "state" of the load and determine how the code will branch to process the incoming parameter records. Three static state variables are maintained which hold the current record type, the current implied directory path, and the current implied file extension.

| Delimiter | State Change |
|---|---|
| *PARAMS* | Sets record type state to "hardware" |
| *NEWDRIVE* | Sets record type state to "software" |
| *NEWEXT*<EXT> | Sets filename extension state to <EXT> |
| *NEWPATH*<PATH> | Sets directory path state to <PATH> |

When the record type is set to "hardware", all data lines are passed to the parameter table load routine param extract( ). When the record type is set to "software", all data lines are passed to the file recognition routine sw_record( ). If the file passed to sw_record( ) is recognized, it is added to the "found file" list.

When the "*ENDPC*" delimiter is encountered which signals the end of one configuration, control returns to LoadOneFile( ) 22. If hardware collection is enabled, the routine HW Recog( ) (R8) 25 is called and hardware components are added to the PRODUCT list 40. If software collection is enabled, the routine SW Recog( ) 26 is called which initiates the product recognition module (PRM). The PRM translates the files recognized by the FRM into software products and adds them to the PRODUCT list 40. When the PRM terminates, control is passed to routine UpDateDB( ) 27 which adds products to the administration database 15. Finally, routine SetLoaded( ) 28 is called to change the "loaded" flag from 0 (not loaded) to 1 (loaded).

Control then returns to LoadOneFile( ) 22 which attempts to read the next configuration from the PCC file 14.

CONFIDENCE FACTORS

Confidence Factors (CFs) were introduced by Artificial Intelligence researchers for combining the results of separate predicates into one conclusion. A CF is a measure of belief or disbelief in a conclusion (predicate, rule.) The FRM generates a "belief" CF for each file it examines by comparing the file's dimensions (name, date, length) harvested by the collector 4 (shown in FIG. 1) to the dimensions defined in the SWP KB (software file knowledge base). The FRM generates a CF for each dimension. All the CFs are then combined into one CF which becomes the total CF for the file. A threshold CF for Positive Identification (PI) must be equaled or exceeded for the FRM to conclude a file belongs on the "found file" list.

The FRM employs a scale of $-100$ (full disbelief) to $+100$ (full certainty). A CF of zero indicates neither belief nor disbelief. All CFs are initialized to zero.

| Confidence Factor Range | | | | | | | | | | |
|---|---|---|---|---|---|---|---|---|---|---|
| DISBELIEF | | | | NEUTRAL | | | | | | BELIEF |
| : | : | : | : | : | : | : | : | : | : | : |
| −100 | −80 | −60 | −40 | 0 | +20 | +40 | +60 | +80 | +100 | |

When a dimension (length, date stamp, time stamp, subdirectory) of an incoming file is compared to candidates in the SWP knowledge base, a CF is calculated for that dimension. When the CFs for all dimensions have been calculated they are then combined into one "total" CF for the file.

Combining Confidence Factors

In a preferred embodiment of the invention the formula for combining CFs is such that the result will always be a valid CF between $-100$ and $+100$. A $+100$ certainty, combined with any other CF will always yield a CF of $+100$, as follows.

$$COMBINECF(cf1,cf2) := ((cf1 + cf2) - ((cf1 * cf2)/100))$$

The following table was generated by the formula above and shows this relationship:

| Confidence Factor Table | | | | | | | | | | | |
|---|---|---|---|---|---|---|---|---|---|---|---|
| | 0 | 10 | 20 | 30 | 40 | 50 | 60 | 70 | 80 | 90 | 100 |
| −100 : | −100 | −80 | −60 | −40 | −20 | 0 | 20 | 40 | 60 | 80 | 100 |
| −90 : | −90 | −71 | −52 | −33 | −14 | 5 | 24 | 43 | 62 | 81 | 100 |
| −80 : | −80 | −62 | −44 | −26 | −8 | 10 | 28 | 46 | 64 | 82 | 100 |
| −70 : | −70 | −53 | −36 | −19 | −2 | 15 | 32 | 49 | 66 | 83 | 100 |
| −60 : | −60 | −44 | −28 | −12 | 4 | 20 | 36 | 52 | 68 | 84 | 100 |
| −50 : | −50 | −35 | −20 | −5 | 10 | 25 | 40 | 55 | 70 | 85 | 100 |
| −40 : | −40 | −26 | −12 | 2 | 16 | 30 | 44 | 58 | 72 | 86 | 100 |
| −30 : | −30 | −17 | −4 | 9 | 22 | 35 | 48 | 61 | 74 | 87 | 100 |
| −20 : | −20 | −0 | 4 | 16 | 28 | 40 | 52 | 64 | 76 | 88 | 100 |
| −10 : | −10 | 1 | 12 | 23 | 34 | 45 | 56 | 67 | 78 | 89 | 100 |
| 0 : | 0 | 10 | 20 | 30 | 40 | 50 | 60 | 70 | 80 | 90 | 100 |
| 10 : | 10 | 19 | 28 | 37 | 46 | 55 | 64 | 73 | 82 | 91 | 100 |
| 20 : | 20 | 28 | 36 | 44 | 52 | 60 | 68 | 76 | 84 | 92 | 100 |
| 30 : | 30 | 37 | 44 | 51 | 58 | 65 | 72 | 79 | 86 | 93 | 100 |

-continued

Confidence Factor Table

|      | 0   | 10  | 20  | 30  | 40  | 50  | 60  | 70  | 80  | 90  | 100 |
|------|-----|-----|-----|-----|-----|-----|-----|-----|-----|-----|-----|
| 40:  | 40  | 46  | 52  | 58  | 64  | 70  | 76  | 82  | 88  | 94  | 100 |
| 50:  | 50  | 55  | 60  | 65  | 70  | 75  | 80  | 85  | 90  | 95  | 100 |
| 60:  | 60  | 64  | 68  | 72  | 76  | 80  | 84  | 88  | 92  | 96  | 100 |
| 70:  | 70  | 73  | 76  | 79  | 82  | 85  | 88  | 91  | 94  | 97  | 100 |
| 80:  | 80  | 82  | 84  | 86  | 88  | 90  | 92  | 94  | 96  | 98  | 100 |
| 90:  | 90  | 91  | 92  | 93  | 94  | 95  | 96  | 97  | 98  | 99  | 100 |
| 100: | 100 | 100 | 100 | 100 | 100 | 100 | 100 | 100 | 100 | 100 | 100 |

Confidence Factor Weighting

Specific dimension comparisons contribute more confidence (greater CF weight) than others to the total CF for a file. This is intentional and reflects the knowledge that, for example, a timestamp match indicates the presence of a specific file to a greater degree than a subdirectory match.

The SRM will handle negative CFs even though they are not currently used. This could be useful if needed, especially within verification tests to assert that a file definitely does not belong to a particular software product ID.

The FRM uses a static data structure to hold the CF contributions for each dimension (FRCF). These numbers can be changed to "tune" the FRM.

Below is the structure definition which shows one embodiment of the CF maximum defaults for each dimension.

```
/*confidence factors for dimension matches */
typedef struct fracf {
    int match_length;
    int match_deltal;
    int match_timestamp;
    int match_subdir;
    int posid;
} FRCF fra_cf = {
    50,         /* length CF */
    5,          /* length spread (in percent) */
    50,         /* timestamp CF */
    25,         /* subdirectory CF */
    50          /* positive identification threshold */
};
```

Dimension Compare Functions

Each dimension is compared by a specific function. Not all functions generate linear CF contributions. Each function is discussed individually below.

CFcalC length( )

The length CF reflects how close the found file length compares to the expected file length. The closer the found length is to the actual file length, the higher the CF contribution.

A "difference" is calculated by taking the absolute difference between a file's expected length (from the KB) and the files harvested length.

A "spread" (a percentage of the target file length above or below the expected length in bytes) is calculated by applying the FRCF (defined above) value match_deltal (expressed as a percentage) to the target length, as follows:

Spread = match delta * expected file length

If the spread is greater than difference, then the CF added to the total CF is defined as:

$$CF = \frac{spread - difference}{spread} \times fra\_cf.match\_length$$

CFcalC timestamp( )

If the timestamp of a found file exactly matches the expected timestamp the full timestamp CF is added. Otherwise the CF returned is zero.

CFcalC SUbdir( )

If the subdirectory of a found file exactly matches the expected subdirectory the full subdirectory CF is added. Otherwise the CF returned is zero.

CFcalc vt( )

Each verification test is assigned a specific CF to contribute when the test succeeds. The CF is determined by looking up the file name in the VT knowledge base and matching the successful test numbers. See the VT discussion for more detail.

FILE RECOGNITION MODULE

The File Recognition Module is the process which determines if a software parameter file record read in from a PCC file sufficiently matches information stored in the software file knowledge base (SWP KB) to conclude that the file is "known" or recognized by the system.

The FRM input required is a file's name, extension, path, timestamp, length and verification test results—all determined by the collector 4 (shown in FIG. 1) in the field. Also, the FRM uses the VTSRM 35 (loaded from VT.KB) and the SWF 34 (loaded from the SWP.KB).

The output produced is a "found file" record which adds information from the KB as well as some statistics. This new information includes the product ID (the ID number of the software product to which the file most likely belongs), the number of files required to comprise a "full" installation, the number of instances of this same file (duplicates), and the class of verification test which it passed (version, name, or none). These identified files are stored on the "found file" list. Files that were not positively identified are discarded as unknown to the system. Files that "tie" with identical confidence factors (i.e. the file is "known" but the software product to which it belongs is in question) are stored on a separate list. These two lists are later recombined during product recognition.

VTPASSED Rank

The "vtpassed" rank of a file shows up throughout the analysis phases of the FRM and PRM. A "V" appearing beside a file name indicates it passed a "version" verification test. An "N" indicates only a name test passed. A "" (blank) indicates no test passed (lowest VT certainty).

FRM Process Data Flow

As the loader reads in a configuration from a PCC file, it separates the hardware parameters from the software parameters. When a software file record is detected, it is passed to the routine SWRecord( ) and processed completely, i.e., its CFs are calculated and the file is either added to the "found file" list or discarded. Once the file is processed, control returns to the PCC file read routine to get the next record. The end result is a list of positively identified files and ties. When all of the software parameter records have been processed, the FRM terminates and the loader calls the Product Recognition Module (PRM).

Figure 3:
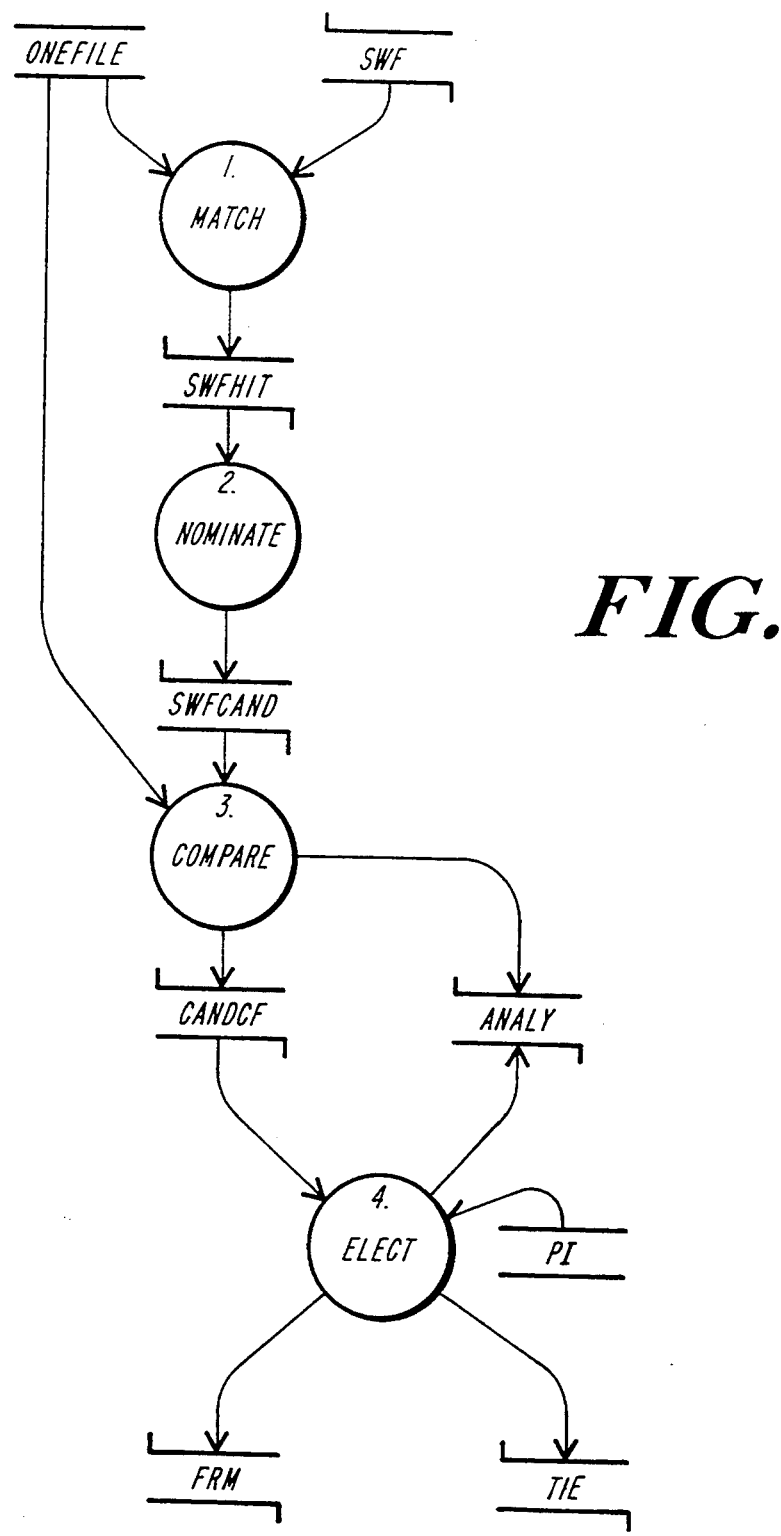
FIG. 3 illustrates a preferred file identification process within a file identification system according to the invention.

In FIG. 3, the ONEFILE 60 data structure is shown as input to two processes. The first bubble, MATCH 50, uses the filespec and attempts to find the file in the "known files" Knowledge Base (KB) list SWF 34. If not found, the FRM gives up (it knows nothing about this file) and discards the file data.

If there is a filespec match, the matching entry in the KB list is copied to the SWFHIT list 61. It is possible that more than one product will share the same filespec in the KB list (the common filespec "SETUP.EXE" is one example). All filespec matches from the KB list are copied to the SWFHIT list 61.

NOMINATE 51 (really a combination of routines) converts all the entries from the SWFHIT list into a "candidate" list structure and adds them to the SWFCAND list 62.

Next COMPARE 52 compares ONEFILE's 60 dimensions with each KB candidate on the SWFCAND list 62 and generates a total CF for each candidate. In FIG. 3, this is represented as a new list "CANDCF" 63 for illustration purposes, when, in reality, the confidence factors are merely added to fields in the SWFCAND node. At this point, all the CFs have been calculated and their records are copied to the ANALY list 64 if analysis has been enabled.

Next the ELECT 53 process scans the evaluated candidate list and chooses the candidate with the highest CF. No file is considered for election unless its CF exceeds the PI threshold. If there is a clear winner, the candidate is copied to the list of recognized files. If there is a CF tie, all tied candidates are copied, instead, to the TIE list 66. Ties have a unique "tiedlevel" assigned which is merely a number used to track which files are tied with each other. This number is used later in the PRM to discard losing candidates when one of the tied group is selected.

Figure 4:
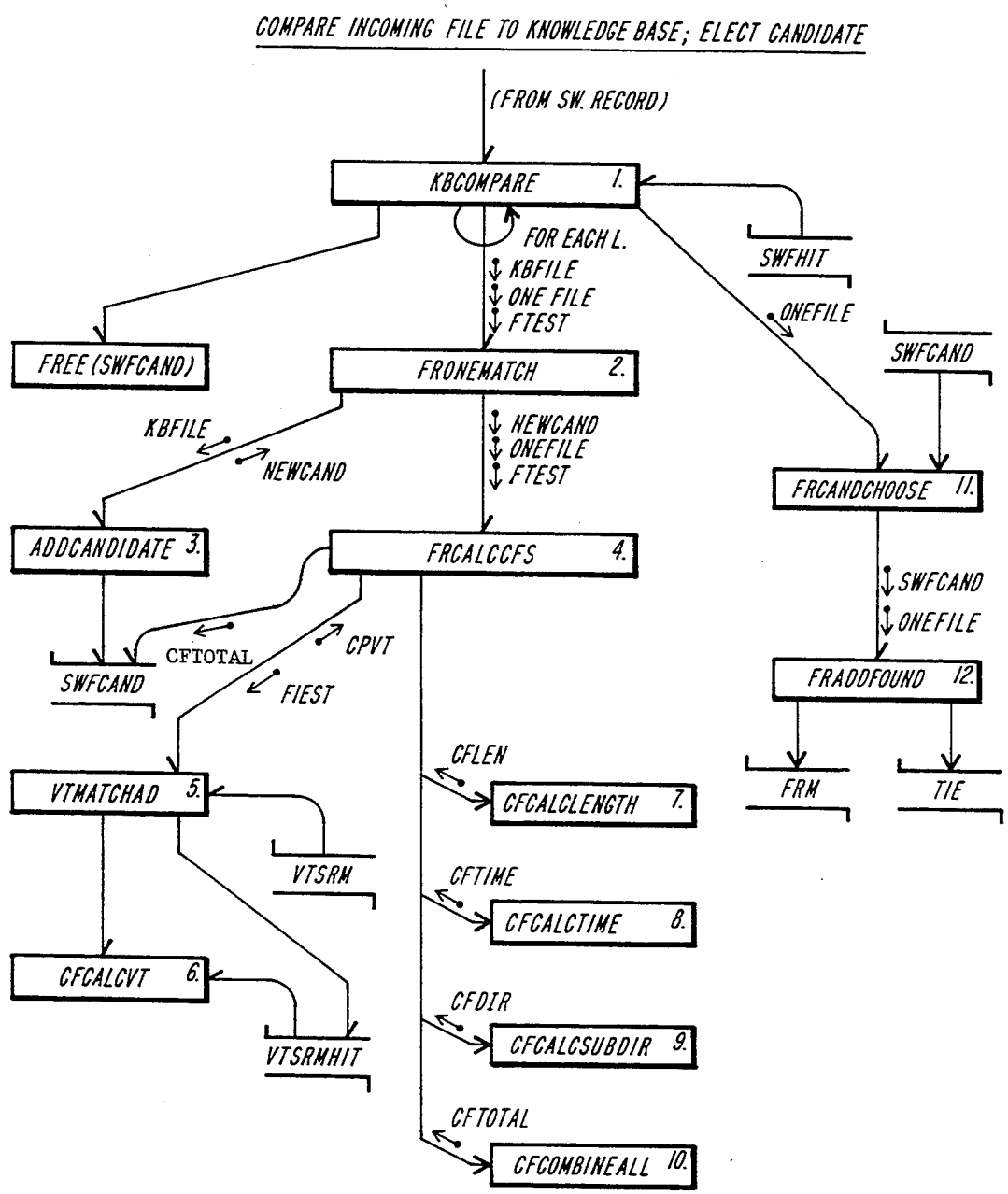
FIG. 4 illustrates a preferred program control structure of the file identification process within a file identification system according to the invention.

FIG. 4 illustrates the FRM process from the program control standpoint. Routine KBCompare( ) 80 initializes by freeing the old SWFCAND list 62. It then passes each KB file record on the SWFHIT list 61 (files in the KB with the same filespec) to routine FROneMatch( ) 81. Each KB file is converted into a candidate and added to the SWFCAND list 62.

Each candidate is compared to the incoming file data and confidence factors are calculated for each dimension. This process is controlled by routine FRCalcCFS 82. Routines CFCalcLength( ) 83, CFCalcTime( ) 84, CFCalcSubDir( ) 85 and VTMatchPID( ) 86 return CF values which are summed by CFCombineAll( ) (R10). This sum becomes the candidate's total CF.

All verification test records in the VTSRM list 35 which match the incoming file name are added to the VTSRMHIT list 95. The VT numbers that succeeded are parsed one by one from the "result" portion of the PCC file line. Each successful test number is looked up in the VTSRMHIT list 95 by routine CFCalcVT( ) 88 and the CF associated with each successful test is combined with the total VT CF.

Once the CFs for all candidates are determined, routine FRCandChoose( ) 89 is called to choose the candidate with the highest CF. Routine FRAddFound( ) 90 adds the winner to the FRM list 96, or, if there is a tie condition, adds the tied candidates to the TIE list 66.

File Recognition Analysis (.FRA)

File Recognition Analysis is part of the "explain" feature of the SRM that reveals how the FRM reached its conclusion to positively identify software files.

The first line of data, "Current CF Weights", displays the current settings of the Confidence Factor (CF) contribution when matching length, timestamp, and subdirectory dimensions. During system tuning these weights can be changed by CFInit( ) and CFLEVELS.CFG.

```
Current CF Weights ...  50L     50T     25S need: (50)
                         ^       ^       ^              ^
                         :       :       :              :
Length match contribution --------:     :       :              :
Timestamp match contribution --------------:   :              :
Subdirectory match contribution ------------------------:     :
Positive Identification (PI) threshold ----------------------------------:
```

Next comes the candidate analysis for each file on the FRM list 96. Recognition file data read from the PCC file 14 is displayed on the first line and preceded by a hyphen ("-").

| Name | Ext | Time | Date | Length | Subdir | VT results |
|------|-----|------|------|--------|--------|------------|
| −123 | CMP | 0B39 | 0AE0 | 133848 | C:\ 2.0 | verified: 2,1 |

The time and date fields are expressed in the DOS bit-mapped HEX format. The length field is expressed in decimal. The verified field is the "result" data generated by the verification test code during software harvest. It indicates the verification test numbers that succeeded for this file.

File data for each candidate compared is listed next, one line per candidate.

| | | | | | | 1. | 2. | 3. | 4. | 5. | 6. |
|---|---|---|---|---|---|---|---|---|---|---|---|
| Prod ID | Time | Date | Length | Subdir | | Len | Time | Dir | VT | Total | VT CFs |
| *S1001022 | 0B39 | 0AE0 | 133848 | \ 123 | | 50L | 50T | 0S | 55V | (89) | 2 = 55 |
| S1001003 | 0CE4 | 0AE1 | 135142 | \ 123 | | 0L | 0T | 0S | 55V | (55) | 1 = 55 |

The product ID of the candidate is listed first. Time, date, length, and subdir fields are the same. Fields 1 through 6 are described below.

1. CF Contributed by length matching

This CF can range from 0 to 50 (in this example). The closer the found file length to the candidate length, the higher the CF.

2. CF contributed by time stamp matching

This CF is either all or nothing. A timestamp must match exactly to contribute to the total° Timestamps are manipulated by software producers to reflect other attributes in addition to modification date, such as version number control. This makes it unwise to use a proportional CF as in the CF contributed by length matching.

3. CF Contributed by subdirectory matching

This CF is either all or nothing. A subdirectory must match exactly to contribute to the total. Subdirectories are often changed to suit a user's organizational style and needs. If there is a match, a relatively small CF contribution is added (ie. not enough to satisfy the PI threshold).

4. CF Contributed by verification tests succeeding

Each VT that passes carries an individual CF since VTs can be used to determine a wide variety of file attributes. See #6 below.

FRA Data Example

Below is an example of data taken from a FRA file.

| -123 | CMP | 0B39 | 0AE0 | 133848 | C:\2.0 | | | | | verified: 2,1 | | |
|---|---|---|---|---|---|---|---|---|---|---|---|---|
| *S1001022 | | 0B39 | 0AE0 | 133848 | \123 | 50L | 50T | 0S | 55V | (89) | 2 = 55 | |
| S1001003 | | 0CE4 | 0AE1 | 135142 | \123 | 0L | 0T | 0S | 55V | (55) | 1 = 55 | |
| -123 | COM | 0B39 | 0AE0 | 2048 | C:\2.0 | | | | | | | |
| *S1001022 | | 0B39 | 0AE0 | 2048 | \123 | 50L | 50T | 0S | 0V | (75) | | |
| -LOTUS | COM | 0B39 | 0AE0 | 5817 | C:\2.0 | | | | | verified: 3,5,7,1 | | |
| *S1001022 | | 0B39 | 0AE0 | 5817 | \123 | 50L | 50T | 0S | 55V | (89) | 6 = 60 | 7 = 55 |
| S1001009 | | 06E2 | 0AE0 | 481 | \123 | 0L | 0T | 0S | 55V | (55) | 5 = 55 | |
| S1001002 | | 12F3 | 0AF1 | 5631 | \123R22 | 0L | 0T | 0S | 55V | (55) | 2 = 60 | 1 = 55 |
| S1001003 | | 0CE4 | 0AE0 | 6045 | \123 | 0L | 0T | 0S | 55V | (55) | 4 = 60 | 3 = 55 |
| -SIDEWAYS | ADN | 0F36 | 0000 | 30018 | C:\2.01 | | | | | verified: 1 | | |
| *S1011003 | | 0F36 | 0000 | 30018 | \123 | 50L | 50T | 0S | 60V | (90) | 1 = 60 | 2 = 55 |
| -SIDEWAYS | APP | 0F36 | 0000 | 37922 | C:\2.01 | | | | | verified: 1 | | |
| *S1011005 | | 0F36 | 0000 | 37922 | \SYMPHONY | 50L | 50T | 0S | 60V | (90) | 1 = 60 | 2 = 55 |
| -123 | CMP | 0CE4 | 0AE1 | 135142 | C:\2.01 | | | | | verified: 2,1 | | |
| S1001022 | | 0B39 | 0AE0 | 133848 | \123 | 0L | 0T | 0S | 55V | (55) | 2 = 55 | |
| *S1001003 | | 0CE4 | 0AE1 | 135142 | \123 | 50L | 50T | 0S | 55V | (89) | 1 = 55 | |

5. CF Total

The total of all contributing CFs combined as discussed above.

6. CF contributed by specific verification tests

This lists the specific CFs contributed by a VT when successful. It is read from the VT KB and is shown here only for reference.

Electing a Candidate

The asterisk appearing just before the product ID indicates the candidate which the FRM chose as the most likely match to the harvested file. This conclusion is arrived solely by picking the highest total CF (field #5).

When two or more candidates share the highest total CF, they are indicated with a "=" appearing just before the product IDs of the tied files.

File Recognition Output (.FRO)

The FRO file is a formatted image of the two lists (FRM "found file" and TIE "tied files") which are passed from the file recognition stage (FRM) to the product recognition stage (PRM). These lists indicate the total output of the FRM and the total input to the PRM.

Note that a file's CF is not used by the PRM and so is not passed. CFs are only used to qualify a file for the FRM list. In addition, only the fact that a file passed a version ("V"), name ("N"), or no (" ") verification test is significant to product recognition, not the test number.

Some new information is extracted from the SWP KB at this point and attached to each found file record. The primary file count ("PC") is the number of files needed to qualify each individual product ID as a full installation. The Secondary file count ("SC") is obsolete and no longer used. The "is-primary" flag ("P") is also obsolete and no longer used (all files are primary).

.FRO Fields Explained

| Name | Ext | Prod ID | 1. VT | 2. TL | 3. PC | 4. P | 5. SC | Full Path Where Found |
|---|---|---|---|---|---|---|---|---|
| 123DOS | EXE | S1001004 | V | | P2 | Y | S0 | D:\123R3 |

1. Verification Test Passed

"V" indicates a version test passed, "N" indicates a name test passed. Blank indicates no test passed.

2. Tie Level

If the file is one of a tie tuple, this number points to the other candidates it is tied with.

3. Primary File Count

The number of files needed to qualify a product as a full installation. Anything less is recognized as a partial installation.

4. Is-primary Flag

Obsolete.

5. Secondary File.Count

Obsolete.

FRO Data Example

Below is an example of data taken from a FRO file.

| Name | Ext | Prod ID | VT | TL | PC | P | SC | Full Path Where Found |
|---|---|---|---|---|---|---|---|---|
| 123DOS | EXE | S1001004 | V |  | P2 | Y | S0 | D:\123R3 |
| 123 | EXE | S1001004 | N |  | P2 | Y | S0 | D:\123R3 |
| DBASE | OVL | S1501003 |  |  | P4 | Y | S0 | D:\DBASE |
| DBASEINL | OVL | S1501003 | V |  | P4 | Y | S0 | D:\DBASE |
| DBASE | EXE | S1501003 |  |  | P4 | Y | S0 | D:\DBASE |
| WIPEFILE | COM | S8511001 | V |  | P18 | Y | S0 | D:\NTEST\DUP3.10 |
| WIPEDISK | COM | S8511001 | V |  | P18 | Y | S0 | D:\NTEST\DUP3.10 |
| VL | COM | S8511001 | V |  | P18 | Y | S0 | D:\NTEST\DUP3.10 |
| UD | COM | S8511001 | V |  | P18 | Y | S0 | D:\NTEST\DUP3.10 |
| TS | COM | S8511001 | V |  | P18 | Y | S0 | D:\NTEST\DUP3.10 |
| TM | COM | S8511001 | V |  | P18 | Y | S0 | D:\NTEST\DUP3.10 |
| SI | COM | S8511001 | V |  | P18 | Y | S0 | D:\NTEST\DUP3.10 |
| SA | COM | S8511001 | V |  | P18 | Y | S0 | D:\NTEST\DUP3.10 |
| QU | COM | S8511001 | V |  | P18 | Y | S0 | D:\NTEST\DUP3.10 |
| -Ties- |  |  |  |  |  |  |  |  |
| BEEP | EXE | S8511004 | N | 01 | P23 | Y | S0 | D:\NC |
| BEEP | EXE | S8511006 | N | 01 | P24 | Y | S0 | D:\NC |
| DS | EXE | S8511005 | N | 02 | P27 | Y | S0 | D:\NC |
| DS | EXE | S8511006 | N | 02 | P24 | Y | S0 | D:\NC |
| DS | EXE | S8511004 | N | 02 | P23 | Y | S0 | D:\NC |
| DT | EXE | S8511005 | N | 03 | P27 | Y | S0 | D:\NC |
| DT | EXE | S8511006 | N | 03 | P24 | Y | S0 | D:\NC |
| DT | EXE | S8511004 | N | 03 | P23 | Y | S0 | D:\NC |
| FA | EXE | S8511004 | N | 04 | P23 | Y | S0 | D:\NC |
| FA | EXE | S8511006 | N | 04 | P24 | Y | S0 | D:\NC |
| FA | EXE | S8511005 | N | 04 | P27 | Y | S0 | D:\NC |
| FF | EXE | S8511005 | V | 05 | P27 | Y | S0 | D:\NC |
| FF | EXE | S8511006 | N | 05 | P24 | Y | S0 | D:\NC |
| FF | EXE | S8511004 | N | 05 | P23 | Y | S0 | D:\NC |

PRODUCT RECOGNITION MODULE (PRM)

The Product Recognition Module determines which software products are represented by the list of "found" files generated by the FRM. It also determines the "completeness" of each product's installation, and it makes an educated guess as to where the product is installed on the hard disk.

The input to the PRM is the FRM list 96, the TIE list 66, and the UV list 36. Please refer to the FRM discussion concerning the generation of these lists.

The output from the PRM is the PRODUCT list 40. The PRODUCT list 40 is shared by hardware and software recognition. It is the master "found" lists of components (a software product is a component—just like a disk drive) and is loaded into the customer's database after the PRM terminates.

When the FRM recognizes a file, it adds an assigned product ID to the file record. Simply put, the PRM works by sorting all the files with the same product ID together and creates an approximation of the "found" product file set (PFS). From there, more sorting and merging continue to factor out "noise" generated by real world installations.

It is possible that duplicate copies of a product version coexist across several logical drives of a PC's hard disk. It is also possible that different versions of the same product coexist and contain similar or identical files among them. It is possible that only partially installed versions coexist with fully installed versions. It is possible that new versions of a product are encountered that the KB does not recognize. How does one recognize all software products with one algorithm.

Discussion of the PRM Process

Once the loader has completed reading all the software records from a configuration, the FRM has produced two lists of recognized files. The first list is the FRM ("found files") and the second is the TIE.

The TIE list contains file records with structures identical to the FRM. Files on the TIE list could not be added to the FRM because their CFs tied with other candidates. That is, the FRM could not determine to which product ID the file belonged.

The PRM attempts to group files together to create a "product file set" (PFS). These files are copied in sorted order from the FRM list to the PRIMARY list by:

1) product ID
2) vtpassed ("V" then "N" then " ")
3) subdirectory
4) duplicate instance In order to sort by subdirectory frequency, the PRM creates a list of all the subdirectories associated with found files for the current product ID (PATH) and orders it from most frequently occurring subdirectory to least (PATHSORT).

When the PRM tries to put together a PFS set for a specific product ID (it considers each ID found in the FRM, one at a time), it looks at the TIE list to see if there are any files on the TIE list that have the product ID currently being considered. If there are, then it gets more specific by selecting the candidate which most likely goes with the group under consideration by matching subdirectories.

In order to sort out duplicates, the PRM assigns a duplicate count to each file as it is added to the PFS. That is, the first instance of a filespec is given the duplicate count of zero, the second instance of the same filespec is given the duplicate count of one, the next two, and so on.

The rule base is applied to the PFS in multiple passes. Most of the time, the default rule will fire. Files are considered by the rule base only if their duplicate count is zero (the first instance). After a conclusion is reached on these files, they are removed from the list. Then all the duplicate counts for the remaining files are decremented by one. Another pass of the rule base is invoked for the files which now have a duplicate count of zero. This process repeats until the list is emptied.

Figure 5:
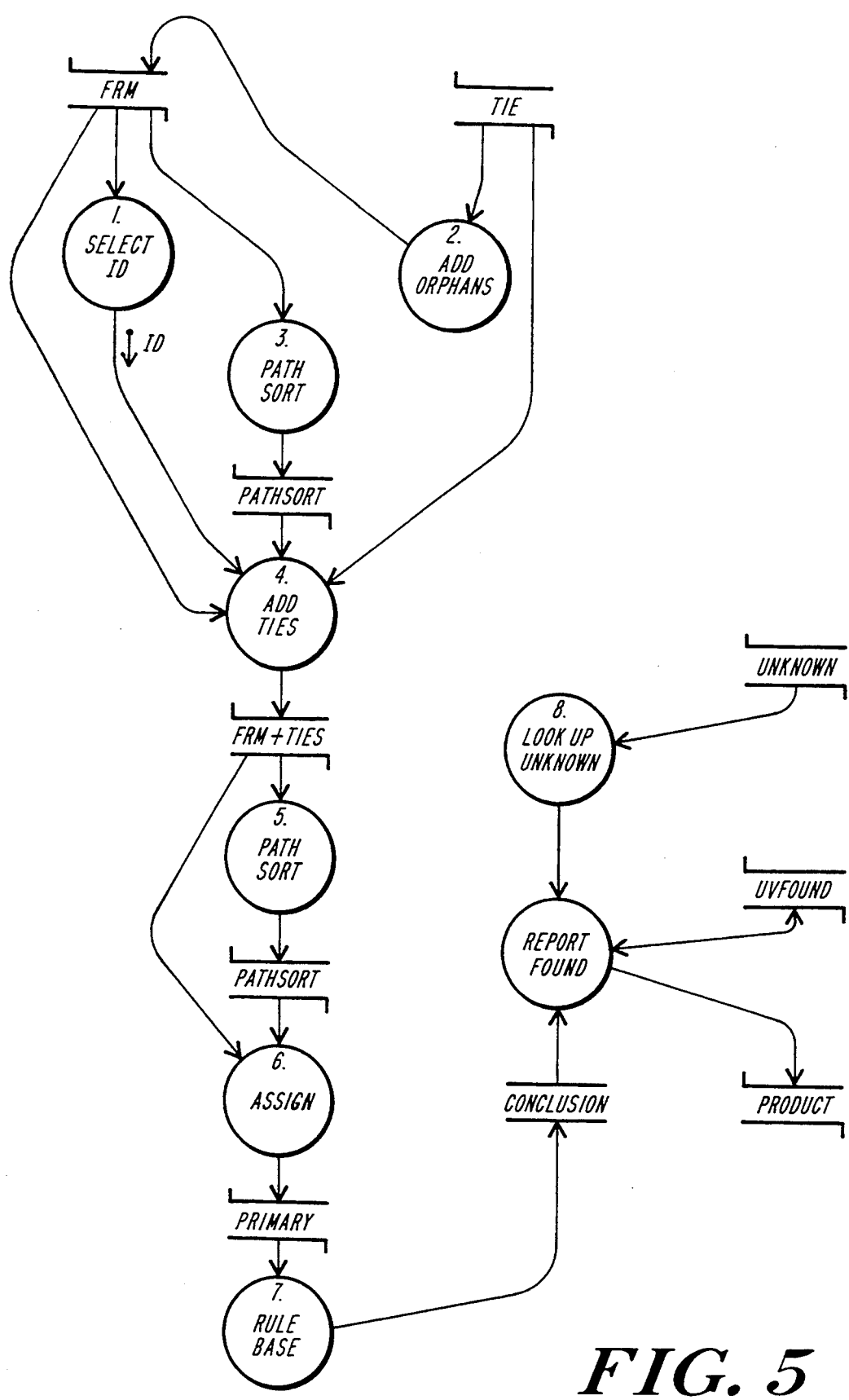
FIG. 5 illustrates the flow of data through a preferred product recognition module of a file identification system according to the invention.

Discussion of FIG. 5

Figure 6:
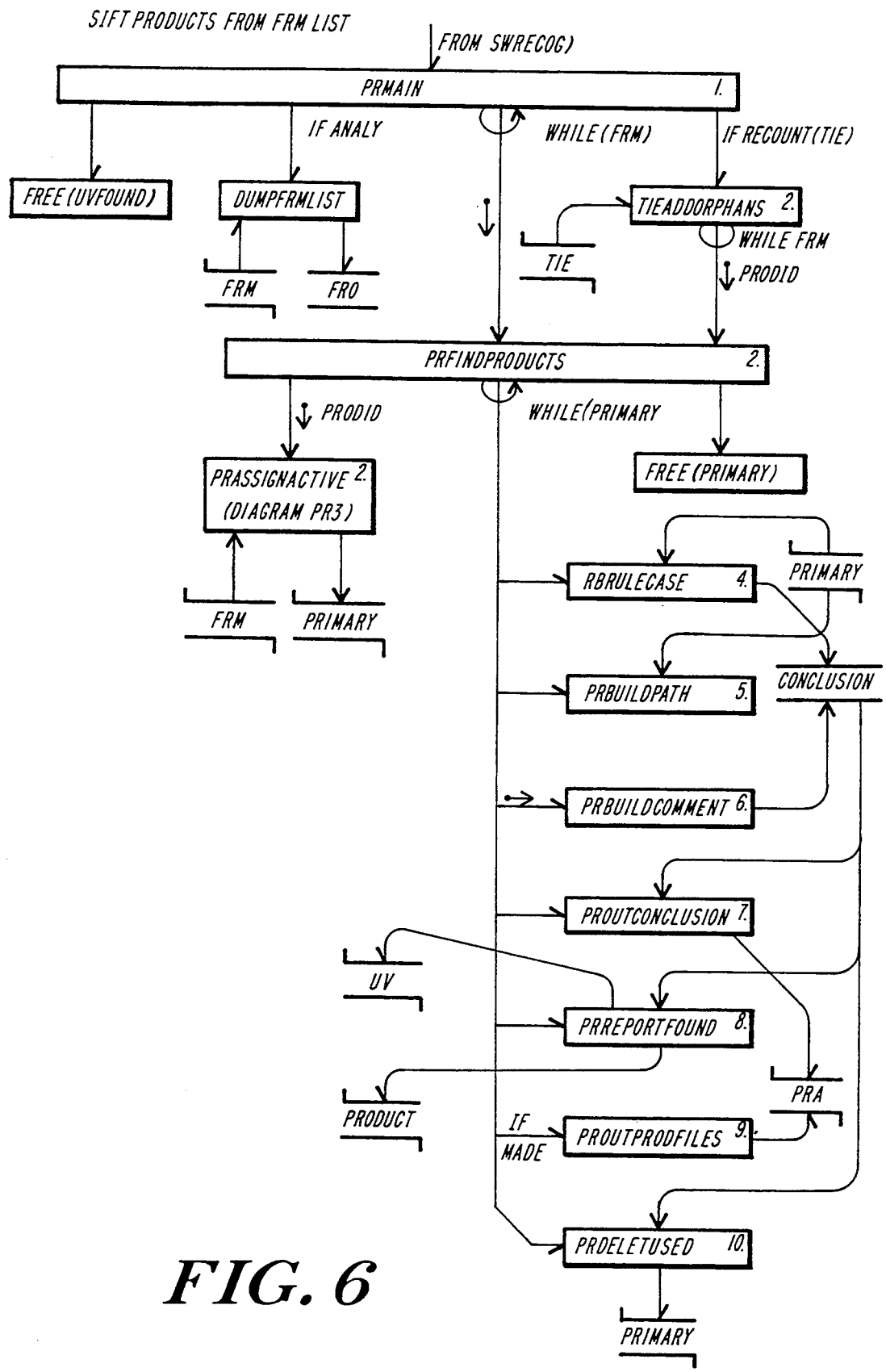
FIG. 6 illustrates the program control structure of a preferred product recognition module of a file identification system according to the invention.
Figure 7:
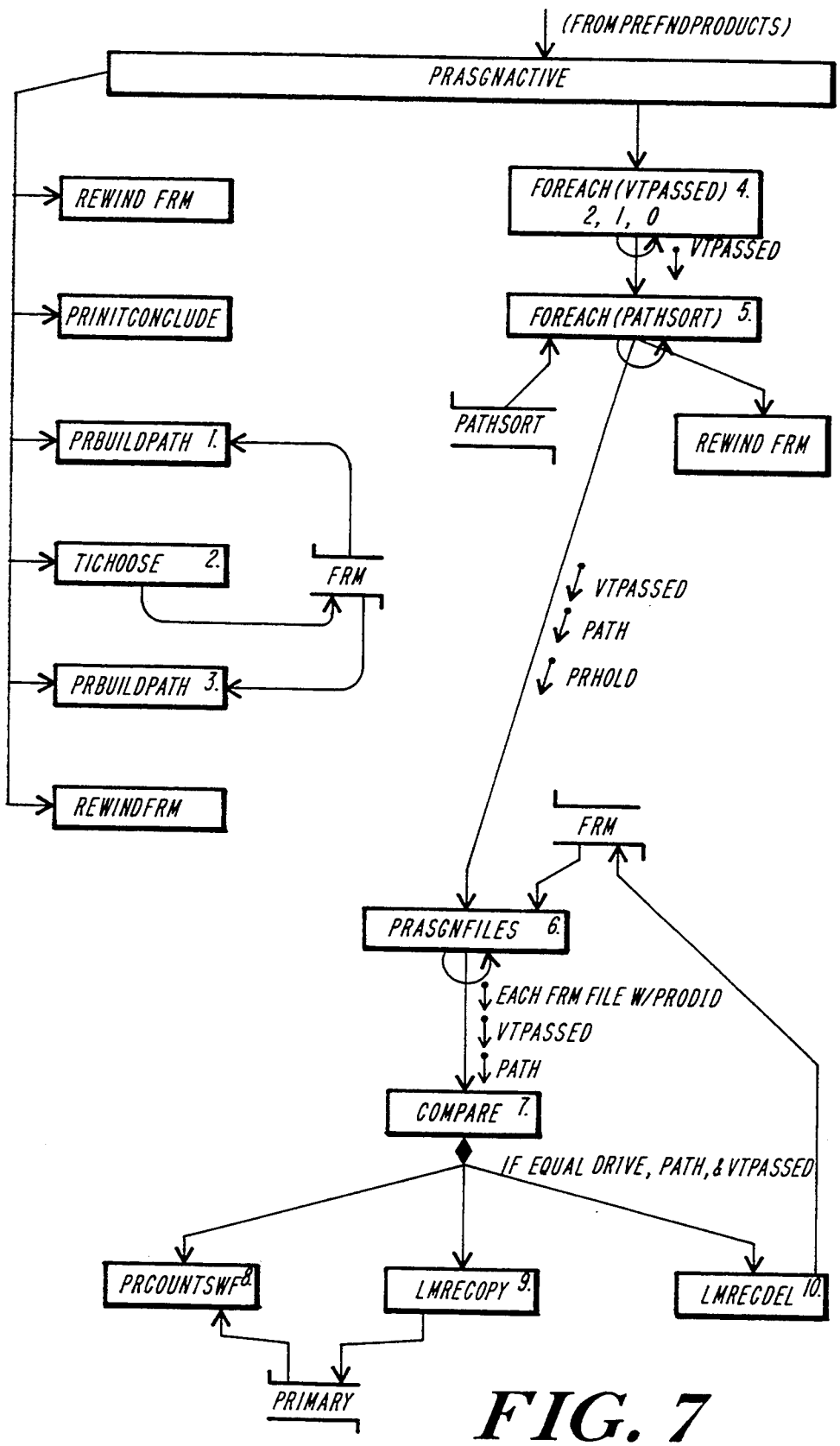
FIG. 7 details the control structure of elements of a preferred product recognition module of a file identification system according to the invention.

FIG. 5 illustrates the flow of data through the PRM. In order to clarify the discussion, some details have been omitted. FIG. 6 and FIG. 7 illustrate the detailed implementation of the PRM.

Input to the PRM consists of the two lists FRM 96 and TIE 66. The FRM list 96 contains all the files recognized by the FRM. Each of these records also contains the product ID to which the FRM determined the files belong, and the "primary" count, the count of files which comprise a "full" or complete installation.

When files are added to the FRM list 96 they are ordered by product ID. The PRM starts at the top of the list and initializes the first conclusion to the first product ID. This product ID becomes the "current" product ID under consideration.

Next the PRM attempts to bring in files from the TIE list which have the current product ID. It makes an educated guess by determining the most frequent subdirectory used by all the files carrying the current product ID. All the subdirectories carried by these files are stored on the PATH list. Then the PATH list is sorted by frequency to the PATHSORT list. The PRM then scans the TIE list 66 looking for subdirectory matches beginning first with the most common subdirectory (the first node in PATHSORT). If a file on the TIE list 66 shares the current product ID and also happened to be harvested from a subdirectory shared by other files with the same product ID, that file is brought into the PFS with the others from the FRM list 96. The file is now considered a "found file" and is hereafter treated as if it originally came via the FRM list 96. This file and any TIE files with the same tie level (the other candidates) are then deleted from the TIE list 66.

Once tie files for this PFS have been brought in, another directory sort is done to include the new tie files in the frequency ordering.

Now the PRM sorts all files sharing the current product ID from the FRM list 96 to the PRIMARY list 121. When a file is copied to the PRIMARY list 121 it is deleted from the FRM list 96. When the FRM list 96 becomes empty, the PRM is finished. The rule base logic 110 operates only on files found on the PRIMARY list 121.

If a file is already listed on the PRIMARY list 121 and a second copy is now added, the second copy of the file will be assigned a duplicate count of 1 (the first duplicate). If a third copy is added, it will be assigned a duplicate count of 2. This information forces files which make up duplicate copies of the same software product to be grouped together in the same rule base "pass".

Files having passed a version test ("V") are considered the most important and are added to the PRIMARY list 121 first. Within the "V" group, files are then sorted by subdirectory frequency. Next files having passed a name test ("N") are added to the PRIMARY list 121. Within the "N" group, files are again sorted by a subdirectory frequency. Finally, files which did not pass a version test are added, these files are also sorted by subdirectory frequency. Below is a sample sort:

| Before Rule Base Pass #1 | | | | |
|---|---|---|---|---|
| WIPEFILE | EXE | 0 | V | D:\NTEST\NU |
| WIPEDISK | EXE | 0 | V | D:\NTEST\NU |
| VL | EXE | 0 | V | D:\NTEST\NU |
| UD | EXE | 0 | V | D:\NTEST\NU |
| TS | EXE | 0 | V | D:\NTEST\NU |
| TM | EXE | 0 | V | D:\NTEST\NU |
| SI | EXE | 0 | V | D:\NTEST\NU |
| SD | EXE | 0 | V | D:\NTEST\NU |
| QU | EXE | 0 | V | D:\NTEST\NU |
| NU | EXE | 0 | V | D:\NTEST\NU |
| NI | EXE | 0 | V | D:\NTEST\NU |
| NCD | EXE | 0 | V | D:\NTEST\NU |
| LP | EXE | 0 | V | D:\NTEST\NU |
| LD | EXE | 0 | V | D:\NTEST\NU |
| FS | EXE | 0 | V | D:\NTEST\NU |
| FR | EXE | 0 | V | D:\NTEST\NU |
| FI | EXE | 0 | V | D:\NTEST\NU |
| FF | EXE | 0 | V | D:\NTEST\NU |
| FA | EXE | 0 | V | D:\NTEST\NU |
| DT | EXE | 0 | V | D:\NTEST\NU |
| DS | EXE | 0 | V | D:\NTEST\NU |
| *SD | EXE* | 1 | N T | D:\NC |
| *FR | EXE* | 1 | N T | D:\NC |
| *VL | EXE* | 1 | N | D:\NC |
| *TM | EXE* | 1 | N | D:\NC |
| SA | EXE | 0 | N | D:\NC |
| *WIPEFILE | EXE* | 1 | | D:\NTEST\4.0 |
| *WIPEDISK | EXE* | 1 | | D:\NTEST\4.0 |
| *VL | EXE* | 2 | | D:\NTEST\4.0 |
| *UD | EXE* | 1 | | D:\NTEST\4.0 |
| *TS | EXE* | 1 | | D:\NTEST\4.0 |
| *TM | EXE* | 2 | | D:\NTEST\4.0 |
| *SI | EXE* | 1 | | D:\NTEST\4.0 |
| *SD | EXE* | 2 | | D:\NTEST\4.0 |
| *SA | EXE* | 1 | | D:\NTEST\4.0 |
| *QU | EXE* | 1 | | D:\NTEST\4.0 |
| *NU | EXE* | 1 | | D:\NTEST\4.0 |
| *NI | EXE* | 1 | | D:\NTEST\4.0 |
| *NCD | EXE* | 1 | | D:\NTEST\4.0 |
| *LP | EXE* | 1 | | D:\NTEST\4.0 |
| *LD | EXE* | 1 | | D:\NTEST\4.0 |
| *FS | EXE* | 1 | | D:\NTEST\4.0 |
| *FR | EXE* | 2 | | D:\NTEST\4.0 |
| *FI | EXE* | 1 | | D:\NTEST\4.0 |
| *FF | EXE* | 1 | | D:\NTEST\4.0 |
| *FA | EXE* | 1 | | D:\NTEST\4.0 |
| *DT | EXE* | 1 | | D:\NTEST\4.0 |
| *DS | EXE* | 1 | | D:\NTEST\4.0 |
| BEEP | EXE* | 0 | | D:\NTEST\4.0 |
| ASK | EXE* | 0 | | D:\NTEST\4.0 |
| *SD | EXE* | 3 | | D:\NTEST\4.01 |
| *FR | EXE* | 3 | | D:\NTEST\4.01 |

Above, the PRM has sorted the FRM list 96 first by verification test priority ("V", then "N" then " "), then by subdirectory (this example does not illustrate subdirectory sorting since all "V" files occurred in the same directory and all "N" files occurred in the same directory.) Note that all the files with an asterisk are duplicates (their duplicate count is greater than zero) and are not considered by rule base pass #1. They are moved to pass #2 (below). Files marked with a "T" indicate they were brought in from the TIE list 66.

| Before Rule Base Pass #2 | | | | |
|---|---|---|---|---|
| SD | EXE | 0 | N | D:\NC |
| FR | EXE | 0 | N | D:\NC |
| VL | EXE | 0 | N | D:\NC |
| TM | EXE | 0 | N | D:\NC |
| WIPEFILE | EXE | 0 | | D:\NTEST\4.0 |
| WIPEDISK | EXE | 0 | | D:\NTEST\4.0 |
| *VL | EXE* | 1 | | D:\NTEST\4.0 |
| UD | EXE | 0 | | D:\NTEST\4.0 |
| TS | EXE | 0 | | D:\NTEST\4.0 |
| *TM | EXE* | 1 | | D:\NTEST\4.0 |

-continued

| Before Rule Base Pass #2 | | | |
|---|---|---|---|
| SI | EXE | 0 | D:\NTEST\4.0 |
| *SD | EXE* | 1 | D:\NTEST\4.0 |
| SA | EXE | 0 | D:\NTEST\4.0 |
| QU | EXE | 0 | D:\NTEST\4.0 |
| NU | EXE | 0 | D:\NTEST\4.0 |
| NI | EXE | 0 | D:\NTEST\4.0 |
| NCD | EXE | 0 | D:\NTEST\4.0 |
| LP | EXE | 0 | D:\NTEST\4.0 |
| LD | EXE | 0 | D:\NTEST\4.0 |
| FS | EXE | 0 | D:\NTEST\4.0 |
| *FR | EXE* | 1 | D:\NTEST\4.0 |
| FI | EXE | 0 | D:\NTEST\4.0 |
| FF | EXE | 0 | D:\NTEST\4.0 |
| FA | EXE | 0 | D:\NTEST\4.0 |
| DT | EXE | 0 | D:\NTEST\4.0 |
| DS | EXE | 0 | D:\NTEST\4.0 |
| *SD | EXE* | 2 | D:\NTEST\4.01 |
| *FR | EXE* | 2 | D:\NTEST\4.01 |

Only duplicate files from pass #1 appear in this second pass. Note that the duplicate count for these files has been decremented.

| Before Rule Base Pass #3 | | | |
|---|---|---|---|
| VL | EXE | 0 | D:\NTEST\4.0 |
| TM | EXE | 0 | D:\NTEST\4.0 |
| SD | EXE | 0 | D:\NTEST\4.0 |
| FR | EXE | 0 | D:\NTEST\4.0 |
| *SD | EXE* | 1 | D:\NTEST\4.01 |
| *FR | EXE* | 1 | D:\NTEST\4.01 |

| Before Rule Base Pass #4 | | | |
|---|---|---|---|
| SD | EXE | 0 | D:\NTEST\4.01 |
| FR | EXE | 0 | D:\NTEST\4.01 |

Tie Orphans

Occasionally, files will remain on the TIE list 66 after the FRM list 96 becomes empty. These files are the only instance of a product ID—their product ID was not shared by any file on the FRM list 96. Ties for that product ID will never be claimed during the assign loop.

These unclaimed files are legitimate occurrences of recognized product files and must be reported. By definition, it is impossible to determine which version a tie file belongs to. Therefore, the only information that can be usefully derived from these remaining files is that an unknown version of a product exists. The product name can be determined by using the tied file's product ID and searching the unknown version list. It doesn't matter which of the tied files is used because the best we will be able to report is an unknown version.

When the FRM list 96 is exhausted, the function TIAddOrphans( ) is called to bring in one tie file from each of the tied candidate groups and add it to the FRM list 96. The main PRM code sequence is executed again with this new FRM list 96.

Discussion of FIG. 6

FIG. 6 illustrates the program control structure of the PRM.

The routine PRMain( ) 140 is the highest level control loop of the PRM. While there are files remaining in the FRM list 96, the PRFindProducts( ) 141 will be executed for each product ID found. When the FRM list 96 is exhausted, if there are any orphan (unclaimed) files on the TIE list 66, they are then brought in by the routine TIAddOrphans( ) 142 and PRFindProducts 141 is called to process these remaining files.

Routine PRFindProducts( ) 141 is the main product recognition loop. PRAsgnActive( ) 143 copies and sorts FRM files to the PRIMARY list 121. Routines 144–150 will be called as many times (passes) as are required to delete all files from the PRIMARY list 121. One conclusion is generated for each pass by routine RBRuleCase( ) 144.

After a conclusion is generated, routines 141 and 146 attempt to locate the "home" directory of the product just found. This is done by sorting all files in the PFS by subdirectory frequency in PRBuildPathList ( ) 145. This information is then formatted by PRBuildComment( ) 146 into the current conclusion comment field. This becomes the PRM determined product location. If a product is found spanning directories, all directories will be listed in the comment field by frequency order.

PROutConclusion( ) 147 and PROutProdFiles( ) 149 send information from the current pass to the .PRA analysis file. PRReportFound( ) 148 will add the current product conclusion to the PRODUCT list 40 if the product is a "full" or "partial".

An "unknown version found" list (UVFOUND) is maintained for the scope of each configuration. When the first occurrence of an unknown product version is reported, its product ID is added to the UVFOUND list. Thereafter, when an unknown version is found, UVLookUpUnknownID( ) is called to check if it is already on the UVFOUND list. IF found there, it is not added to the PRODUCT list 40. This prevents reporting unknown versions for the same product more than once.

PRDeleteFiles( ) 150 deletes all the files that were analyzed in the current pass for the current product ID (all PRIMARY files with duplicate==0).

Discussion of FIG. 7

FIG. 7 details the control structure of PRAsgn Active( ) 143 (not discussed in detail).

Rule Base

Once the PRIMARY list 121 is established, the product recognition rule is applied to the list. The default rule for identifying software products can be expressed as follows:

For all files on the PRIMARY list 121:
If a file exists with "known version"
  CONCLUDE: version is known
  If the file count found=the product defined file count
    CONCLUDE: installation is "full"
  else
    CONCLUDE: installation is "partial"
Else if a file exists with "known name"
  CONCLUDE: version is unknown
  CONCLUDE: installation is unknown (note 1)
Else
  CONCLUDE: version is unknown
  CONCLUDE: installation is absent (note 2)

1. If the product version in unknown, it is not possible to determine how many files belong to the product set.
2. This means no product was identified. Nothing is reported.

The above rule is implemented in the 'C' programming language as a set of macros and functions which operate on the PRIMARY list.

Rule Firing

The rule base mechanism implemented for the PRM is intended primarily for handling exceptions to the basic PRM default behavior. The default rule will not "fire" (ie. execute) when the current conclusion product ID is one of the product IDs which has an exception rule defined. Unlike a true rulebase system, each rule is actually a separate 'C' function. The function RBRuleCase( ) determines which rule (only ONE) will fire. It is also implemented as a 'C' macro.

The following macro is used to generate a series of compiled IF statements which will recognize an exception product ID and call the exception rule routine to handle it.

```
#define  IDFIRERULE(x,y)  if  (strcmp(current.prodid,
                                  #x)==0)\##y();
                                  return; }
```

If the product ID is not recognized, the default rule is executed. Actual source code follows:

```
void RBRuleCase()
[
    /* Brooklyn Bridge Ver 3.0 rule */
    IDFIRERULE(S3041012, RBRuleS3041012);
    /* Brooklyn Bridge Ver 1.3 rule */
    IDFIRERULE(S3041010, RBRuleS3041010);
    RBRuleDEFAULT():
]
```

Adding Exception Rules

Adding rules to the system involves 1) defining the rule by using the macro operations (usually by copying another rule and modifying it slightly), 2) naming the function, and 3) adding a rule "trigger" to RBRuleCase( ). The naming convention for new rule functions is:

"RBRule" + <product-id>

PRA Output From Product Recognition Analysis

When analysis is enabled, the PRM produces the .PRA file. This file contains a record of all conclusions and all supporting data for each conclusion.

The first line is a numbered conclusion. Following the conclusion product ID there are two numbers. The first number is the count of unique files found sharing the conclusion product ID. The second number is the primary file count—the number of files required to conclude a full installation is present. If the two numbers equal one another, a full known version is the conclusion. If the first is less than the second, a partial version is the conclusion.

Following these two numbers is one or more comma-delimited directory paths. This is the directory in which the PRM concluded the product is located. When more than one path is listed, first path is where the most files were found.

If an unknown version is concluded, the unknown version product ID is displayed in a short "Added as" message. If a second unknown version is concluded, the second version is not added to the product list and a "Duplicate Unknown [version concluded]; not added" message is displayed.

| Example PRA output | | | | | |
|---|---|---|---|---|---|
| (1) PRODUCT: S1001004 PRIMARIES: 2/2 Full Known Version D:\123R3 | | | | | |
| 123DOS | EXE | 0 | V | | D:\123R3 |
| 123 | EXE | 0 | V | | D:\123R3 |

| -continued | | | | | |
|---|---|---|---|---|---|
| Example PRA output | | | | | |
| Version D:\DBASE | | | | | |
| DBASEINL | OVL | 0 | V | | D:\DBASE |
| DBASE | OVL | 0 | | | D:\DBASE |
| DBASE | EXE | 0 | | | D:\DBASE |
| SD | EXE | 0 | N | T | D:\NC |
| FR | EXE | 0 | N | T | D:\NC |
| VL | EXE | 0 | N | | D:\NC |
| TM | EXE | 0 | N | | D:\NC |
| WIPEFILE | EXE | 0 | | | D:\NTEST\4.0 |
| WIPEDISK | EXE | 0 | | | D:\NTEST\4.0 |
| *VL | EXE* | 1 | | | D:\NTEST\4.0 |
| UD | EXE | 0 | | | D:\NTEST\4.0 |
| TS | EXE | 0 | | | D:\NTEST\4.0 |
| *TM | EXE* | 1 | | | D:\NTEST\4.0 |
| SI | EXE | 0 | | | D:\NTEST\4.0 |
| *SD | EXE* | 1 | | | D:\NTEST\4.0 |
| SA | EXE | 0 | | | D:\NTEST\4.0 |
| (9) PRODUCT: S8511006 PRIMARIES: 24/24 Full Known Version D:\NU, D:\4.0, D:\NC | | | | | |
| FA | EXE | 0 | V | | D:\NTEST\NU |
| DT | EXE | 0 | V | | D:\NTEST\NU |
| DS | EXE | 0 | V | | D:\NTEST\NU |
| *SD | EXE* | 1 | N | T | D:\NC |
| *FR | EXE* | 1 | N | T | D:\NC |
| *VL | EXE* | 1 | N | | D:\NC |
| *TM | EXE* | 1 | N | | D:\NC |
| SA | EXE | 0 | N | | D:\NC |
| *WIPEFILE | EXE* | 1 | | | D:\NTEST\4.0 |
| *WIPEDISK | EXE* | 1 | | | D:\NTEST\4.0 |
| *VL | EXE* | 2 | | | D:\NTEST\4.0 |
| (25) PRODUCT: S7001008 PRIMARIES: 0/12 Named Unkown Version C:\PERI\4.01 (Duplicate Unknown: S7001004 not added) | | | | | |
| RUN | COM | 0 | N | | C:\PERI\4.\01 |
| SYSLOAD | SYS | 0 | | | C:\PERI\4\01 |
| TS | COM | 0 | | | C:\PERI\4\01 |
| SYMLOAD | COM | 0 | | | C:\PERI\4\01 |
| RS | COM | 0 | | | C:\PERI\4\01 |
| PUBLIC | COM | 0 | | | C:\PERI\4\01 |
| PSKEY | COM | 0 | | | C:\PERI\4\01 |
| PS3 | COM | 0 | | | C:\PERI\4\01 |
| PS1 | COM | 0 | | | C:\PERI\4\01 |
| PS | COM | 0 | | | C:\PERI\4\01 |
| INT | COM | 0 | | | C:\PERI\4\01 |
| CLEARNMI | COM | 0 | | | C:\PERI\4\01 |
| (41) PRODUCT: S7001006 PRIMARIES: 0/9 Named Unknown Version C:\PERI\4.22 (Duplicate Unknown; S7001004 not added) | | | | | |
| RUN | COM | 0 | N | T | C:\PERI\4.22 |

Described above are improved methods and apparatus for inventorying software on digital data processor apparatus. Those skilled in the art will appreciate that the illustrated embodiment is exemplary and that other methods and apparatus including additions and modifications of the illustrated system fall within the scope of the invention, of which

We claim:

1. A file inventorying apparatus for determining a status of a member file in a storage means of a digital data processor, said storage means for storing one or more files,
   each file storing one or more information-representative signals and having at least a file name,
   said status including a name associated with one or more known file sets and optionally including a version number,
said file inventorying apparatus comprising
   A. collection means coupled with said storage means for identifying the file name of said member file,
   B. list means for storing a file name and one or more patterns of information-representative signals associated with at least one component file of each of a plurality of known file sets,
   C. comparison means, coupled to said list means and to said collection means, for comparing the file name of said member file with those of at least selected ones of said component files, and for generating name-match signals representative of candidate component files whose names are substantially identical to that of said member file, D. test means, coupled to said storage means, said comparison means, and said list means, for responding to said name-match signals for running one or more tests against said member file, at least one such test including comparing at least selected information-representative signals of said member file with said one or more patterns of information-representative signals associated with each of said candidate component files, and for generating one or more test-result signals representative of the results of those tests, E. loader means, coupled with said test means, for determining said status of said member file, said loader means including i) confidence means responsive to
  a) the file name of said member file,
  b) a name associated with a known file set with which a candidate component file is associated,
  c) one or more of said test-result signals, for generating a signal representative of a confidence factor of the association between said member file and that known file set, and said loader means further including output means responsive to at least a selected confidence factor for generating an output signal representative of the status of said member file, said status including at least the name associated with that known file set.

2. A file inventorying apparatus according to claim 1 wherein said confidence means includes means for generating said confidence factor signal as a function of i) a file length of said member file,
ii) a time stamp of said member file,
iii) a subdirectory within said storage means associated with said member file, and
iv) one or more of said member file name, the name associated with said known file set, and test-result signals.

3. A file inventorying apparatus according to claim 2, further comprising means for determining the status of said member file by identifying one or more known file sets with which that file has a highest confidence factor.

4. A file inventorying apparatus according to claim 3, further comprising

A. a host processor and one or more remote processors,
B. portable processor means for invoking each of said list means, comparison means, and said test means on at least said remote processors, said portable processor including
  PCC file means, coupled to said test means and responsive to said name-match signals, for selectively recording the file name of said member file, and information representative of the name of the known file set of each of said candidate files, and the corresponding test-result signals.
C. said host processor means, coupled to said PCC file means, and including said loader means for determining from the information recorded therein the status of said member files.

5. A file inventorying apparatus according to claim 1, wherein said list means includes means for storing for each component file a pattern of information-representative signals comprising a character string associated with that component file.

6. A file inventorying apparatus according to claim 5, wherein said test means comprises string-compare means for searching said member file for an occurrence of at least one of said character strings.

7. A file inventorying apparatus according to claim 6, wherein

A. said list means includes means for storing, for at least selected character string associated with a strong component file, a location within that component file where that character string occurs, and
B. said string-compare means includes means for searching said member file for an occurrence of at least one of said character string at a specific location associated therewith.

8. A file inventorying apparatus according to claim 1, wherein said loader means includes control means for generating at least one of i) a found file list indicative of member files which corresponds most closely with one of said component files, and
ii) a tie file list indicative of member files which corresponds most closely with two or more of said component files.

9. A file inventorying apparatus according to claim 8, wherein said loader means includes means for generating in said found file list one or more entries, each of which includes of the file name of a member file and optionally includes i) a primary file count number corresponding to the number of component files in the known file set having the same common name identifier as said member file, and
ii) one or more of said test-result signals.

10. A file inventorying apparatus according to claim 1, comprising census means for identifying a product file set comprising a plurality of member files that correspond to a common known file set.

11. A file inventorying apparatus according to claim 10, wherein

A. said census means includes installation means for identifying an installation status of a product file set, said installation status being indicative of a degree of correspondence between said product file set and said known file set,
B. said installation means including means for comparing a number of said member files contained in said product file set with the number of said component files contained in the corresponding common known file set.

12. A file inventorying apparatus according to claim 11, wherein said census means includes directory means for identifying a file structure identifier of a location where said product file set is stored in said digital data processor storage means.

13. A file inventorying apparatus for determining a status of a member file in the storage means of a digital data processor, said storage means for storing one or more files, each file storing one or more information-representative signals and having at least a file name,
said status including a name associated with one or more known file sets and optionally including a version number,
said file inventorying apparatus comprising A. list means for storing a file name and one or more patterns of information-representative signals associated with at least one component file of each of a plurality of known file sets, B. test means, coupled to said storage means and to said list means, for comparing at least selected information-representative signals of said member file with said one or more patterns of information-representative signals associated with selected ones of said component files, and for generating test-result signals representative of the results of those comparisons, and C. loader means, coupled to said test means and responsive to said test-result signals, for identifying one or more known file sets having component files which most closely correspond to said member file.

14. A file inventorying apparatus according to claim 13, the further improvement wherein said test means comprises comparison means for comparing the file name of said member file with those of at least selected ones of said component files, and for generating name-match signals representative of candidate component files whose names are substantially identical to that of said member file.

15. A file inventorying apparatus according to claim 14, the further improvement wherein said test means comprises means for responding to said name-match signals for running one or more tests against said member file, at least one such test including comparing at least selected information-representative signals of said member file with said one or more patterns of information-representative signals associated with each of said candidate component files to generate said test-result signals.

16. A file inventorying apparatus according to claim 15, the further improvement wherein said loader means includes confidence means responsive to said name-match signals for generating a signal representative of a confidence factor of the association between said member file and said known file set, wherein said confidence factor is based on the file name of said member file, information representative of a name of said known file set, and one or more of said test-result signals.

17. A file inventorying apparatus according to claim 15, the further improvement wherein said loader means includes output means responsive to at least a selected confidence factor for generating an output signal representative of the status of said member file, said status including at least the common name identifier associated with the corresponding known file set.

18. A file inventorying apparatus according to claim 13, wherein said loader means further comprises
A. a database comprising information-representative signals associated with said component files and selected characteristics of said component files, and
B. a selection means for choosing the component files which most closely correspond to said member file, wherein said selection means is responsive to said information-representative signals stored in said database.

19. A file inventorying method for determining a status of a member file in a storage means of a digital data processor, said storage means for storing one or more files,
each file storing one or more information-representative signals and having at least a file name, said status including a name associated with one or more known file sets and optionally including a version number,
said file inventorying comprising
A. identifying the file name of said member file,
B. storing a file name and one or more patterns of information-representative signals associated with at least one component file of each of a plurality of known file sets,
C. comparing the file name of said member file with those of at least selected ones of said component files, and generating name-match signals representative of candidate component files whose names are substantially identical to that of said member file,
D. testing said member file, in response to said name-match signals, by running one or more tests against said member file, at least one such test including comparing at least selected information-representative signals of said member file with said one or more patterns of information-representative signals associated with each of said candidate component files, and for generating one or more test-result signals representative of the results of those tests,
E. determining said status of said member file, said determining step including
  i) generating a signal representative of a confidence factor of the association between said member file and said known file set, said confidence factor generated in response to the file name of said member file, information representative of a name of said known file set, and to one or more of said test-result signals, and
  ii) generating an output signal, responsive to at least a selected confidence factor, representative of the status of said member file, said status including at least the name associated with the corresponding known file set.

20. A file inventorying method according to claim 19, wherein
A. said testing step further comprises determining at least one of the following characteristics:
  i) a file length of said member file,
  ii) a time stamp of said member file, and
  iii) a subdirectory within said storage means associated with said member file, and
B. said confidence factor is generated in response to those characteristics, as well as to one or more of said member file name, known file set name, and said test-result signals.

21. A file inventorying method according to claim 20, wherein said determining step further comprises identifying one or more known file sets with which the member file has a highest confidence factor.

22. A file inventorying method according to claim 21, for determining a status of member files in storage means of one or more remote processors, said method comprising:
A. invoking each of said storing step, said comparing step, and said testing step on at least said remote processors
B. selectively recording PCC information including
  i. the file name of said member file,
  ii. information representative of the name of the known file set of each of said candidate files, and
  iii. the corresponding test-result signals,
C. reading on said host processor said PCC information, and D. invoking on said host processor said determining step for determining from said PCC information the status of said member files.

23. A file inventorying method according to claim 19, wherein said storing step further comprises storing, for each component file, a pattern of information-representative signals comprising a character string associated with that component file.

24. A file inventorying method according to claim 23, wherein said testing step further comprises a string-comparing step for searching said member file for an occurrence of at least one of said character strings.

25. A file inventorying method according to claim 24, wherein
   A. said storing step further comprises storing, for at least selected character string associated with a component file, a location within that component file where that character string occurs, and
   B. said string-comparing step further comprises searching said member file for an occurrence of at least one of said character string at a specific location associated therewith.

26. A file inventorying method according to claim 19, wherein said determining step further comprises generating at least one of
   i) a found file list indicative of member files which corresponds most closely with one of said component files, and
   ii) a tie file list indicative of member files which corresponds most closely with two or more of said component files.

27. A file inventorying method according to claim 26, wherein said determining step further comprises generating in said found file list one or more entries, each of which includes the file name of a member file and optionally includes
   i) a primary file count number corresponding to the number of component files in the known file set having the same common name identifier as said member file, and
   ii) one or more of said test-result signals.

28. A file inventorying method according to claim 19, including a census step for identifying a product file set comprising a plurality of member files that correspond to a common known file set.

29. A file inventorying method according to claim 28, wherein said census step comprises:
   A. comparing a number of said member files contained in said product file set with the number of said component files contained in the corresponding common known file set, and
   B. identifying an installation status of a product file set indicative of a degree of correspondence between said product file set and said known file set.

30. A file inventorying method according to claim 29, wherein said census step further comprises identifying a file structure identifier of a location where said product file set is stored in said digital data processor storage means.

31. A file inventorying method for determining a status of a member file in a storage means of a digital data processor, said storage means for storing one or more files,
   each file storing one or more information-representative signals and having at least a file name,
   said status including a name associated with one or more known file sets and optionally including a version number,
   said file inventorying method comprising
   A. storing a file name and one or more patterns of information-representative signals associated with at least one component file of each of a plurality of known file sets,
   B. testing said member file by, comparing at least selected information-representative signals of said member file with said one or more patterns of information-representative signals associated with selected ones of said component files, and generating test-result signals representative of the results of those comparisons, and
   C. determining one or more known file sets having component files which most closely correspond to said member file.

32. A file inventorying method according to claim 31, wherein said testing step further comprises comparing the file name of said member file with those of at least selected ones of said component files, and generating name-match signals representative of candidate component files whose names are substantially identical to that of said member file.

33. A file inventorying method according to claim 32, wherein said testing step further comprises responding to said name-match signals for running one or more tests against said member file, at least one such test including comparing at least selected information-representative signals of said member file with said one or more patterns of information-representative signals associated with each of said candidate component files to generate said test-result signals.

34. A file inventorying method according to claim 33, wherein said determining step further comprises generating a signal representative of a confidence factor of the association between said member file and said known file set, wherein said confidence factor is generated in response to said name-match signals and is based on the file name of said member file, information representative of a name of said known file set, and one or more of said test-result signals.

35. A file inventorying method according to claim 33, wherein said determining step further comprises generating an output signal in response to at least a selected confidence factor, representative of the status of said member file, said status including at least the common name identifier associated with the corresponding known file set.

36. A file inventorying method according to claim 31, wherein said determining step further comprises:
   A. searching a database comprising information-representative signals associated with said component files and selected characteristics of said component files, and
   B. choosing the component files which most closely correspond to said member file, wherein said choosing step is responsive to said information-representative signals stored in said database.

37. A system for inventorying a member file in a digital data processing apparatus, said member file having a file name and storing one or more information-representative signals, said system comprising
   A. comparison means for comparing the file name of said member file with file name of at least one component file from each of plural known file sets, and for identifying as a candidate a component file whose file name is substantially identical to that of the member file, B. test means, coupled to said comparison means, for comparing information-representative signals stored in the member file with information-representative signals associated with a candidate, and for generating a test-result signal representative of results of such comparison, C. loader means, coupled with said test means, for determining a confidence factor representing a degree of association between said member file and the known file set with which a candidate is associated, said determination being based on
   a) the file name of said member file,
   b) the set name of that known file set, and
   c) the results represented by said test-result signal, said loader means for responding to at least a selected such confidence factor for outputting, for inventorying purposes, that set name.

38. A system for inventorying a member file in a digital data processing apparatus, said member file having a file name and storing one or more information-representative signals, said system comprising
   A. test means for comparing information-representative signals stored in the member file with information-representative signals associated with a candidate component file selected from a plurality of known file sets, and for generating a test-result signal representative of results of such comparison,
   B. loader means, coupled with said test means, for determining a confidence factor representing a degree of association between said member file and the known file set with which a candidate is associated, said determination being based on
      a) the file name of said member file,
      b) the set name of that known file set, and
      c) the results represented by said test-result signal, said loader means for responding to at least a selected such confidence factor for outputting, for inventorying purposes, that set name.

* * * * *